United States Patent
Johnson et al.

(10) Patent No.: US 11,847,508 B2
(45) Date of Patent: *Dec. 19, 2023

(54) CONVERGENCE AMONG CONCURRENTLY EXECUTING THREADS

(71) Applicant: NVIDIA Corp., Santa Clara, CA (US)

(72) Inventors: Daniel Robert Johnson, Austin, TX (US); Jack Choquette, Palo Alto, CA (US); Olivier Giroux, Santa Clara, CA (US); Michael Patrick McKeown, Cupertino, CA (US); Mark Stephenson, Austin, TX (US); Sana Damani, Atlanta, GA (US)

(73) Assignee: NVIDIA CORP., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,243

(22) Filed: Aug. 11, 2022

(65) Prior Publication Data

US 2023/0038061 A1    Feb. 9, 2023

Related U.S. Application Data

(63) Continuation of application No. 16/567,993, filed on Sep. 11, 2019, now Pat. No. 11,442,795.

(60) Provisional application No. 62/729,929, filed on Sep. 11, 2018.

(51) Int. Cl.
  *G06F 9/52* (2006.01)
  *G06F 9/38* (2018.01)
  *G06F 9/48* (2006.01)

(52) U.S. Cl.
  CPC .......... *G06F 9/522* (2013.01); *G06F 9/3836* (2013.01); *G06F 9/3887* (2013.01); *G06F 9/4881* (2013.01)

(58) Field of Classification Search
  CPC .... G06F 9/3009; G06F 9/3836; G06F 9/3851; G06F 9/3887; G06F 9/4881; G06F 9/52–522

See application file for complete search history.

(56) References Cited

U.S. PATENT DOCUMENTS

| | | | |
|---|---|---|---|
| 6,061,710 A * | 5/2000 | Eickemeyer | .......... G06F 9/3851 712/228 |
| 7,673,122 B1 | 3/2010 | Song et al. | |
| 9,424,099 B2 * | 8/2016 | Houston | ................... G06F 9/52 |
| 9,612,836 B2 | 4/2017 | Ohannessian et al. | |
| 9,898,287 B2 | 2/2018 | Puthoor et al. | |
| 10,402,937 B2 | 9/2019 | Dimitrov et al. | |
| 10,409,571 B1 * | 9/2019 | Targowski | ............... G06F 9/522 |
| 10,430,915 B2 | 10/2019 | Khodakovsky et al. | |
| 10,581,645 B1 | 3/2020 | Song et al. | |

(Continued)

OTHER PUBLICATIONS

Lee et al., "Convergence and Scalarization for Data-Parallel Architectures", published by IEEE, CGO'Feb. 23-27, 13, 2013, Shenzhen, China, pp. 1-11 (Year: 2013).*

(Continued)

*Primary Examiner* — S. Sough
*Assistant Examiner* — Zheng Wei
(74) *Attorney, Agent, or Firm* — Rowan TELS LLC

(57) ABSTRACT

Convergence of threads executing common code sections is facilitated using instructions inserted at strategic locations in computer code sections. The inserted instructions enable the threads in a warp or other group to cooperate with a thread scheduler to promote thread convergence.

19 Claims, 28 Drawing Sheets

(56) References Cited

U.S. PATENT DOCUMENTS

| | | | |
|---|---|---|---|
| 10,599,404 B1 | 3/2020 | Neto et al. | |
| 10,699,427 B2 | 6/2020 | Uralsky et al. | |
| 11,768,715 B1* | 9/2023 | Eltantawy | G06F 9/4881 |
| | | | 718/106 |
| 2007/0074213 A1* | 3/2007 | Ma | G06F 9/3851 |
| | | | 717/149 |
| 2007/0143755 A1* | 6/2007 | Sahu | G06F 9/467 |
| | | | 712/E9.05 |
| 2007/0180438 A1 | 8/2007 | Suba | |
| 2011/0219221 A1 | 9/2011 | Skadron et al. | |
| 2012/0096474 A1* | 4/2012 | Jiao | G06F 9/522 |
| | | | 718/107 |
| 2013/0117541 A1 | 5/2013 | Choquette et al. | |
| 2013/0166881 A1 | 6/2013 | Choquette et al. | |
| 2014/0164737 A1* | 6/2014 | Collange | G06F 9/3851 |
| | | | 712/205 |
| 2014/0165049 A1 | 6/2014 | Diamos et al. | |
| 2014/0340403 A1 | 11/2014 | Droske et al. | |
| 2014/0365752 A1 | 12/2014 | Howes et al. | |
| 2015/0026438 A1* | 1/2015 | Giroux | G06F 9/38 |
| | | | 712/225 |
| 2016/0019066 A1 | 1/2016 | Diamos et al. | |
| 2017/0315806 A1* | 11/2017 | Mazumdar | G06F 9/30094 |
| 2019/0088009 A1 | 3/2019 | Forey et al. | |
| 2019/0213775 A1 | 7/2019 | Dimitrov et al. | |
| 2019/0243654 A1 | 8/2019 | Mirhosseininiri et al. | |
| 2019/0304049 A1 | 10/2019 | Ray et al. | |
| 2020/0043228 A1 | 2/2020 | Patrick et al. | |
| 2020/0081748 A1 | 3/2020 | Johnson et al. | |
| 2020/0143590 A1 | 5/2020 | Gruen | |
| 2020/0175392 A1 | 6/2020 | Tang et al. | |
| 2020/0210276 A1 | 7/2020 | Sullivan et al. | |
| 2021/0141643 A1* | 5/2021 | Horsnell | G06F 9/3004 |

OTHER PUBLICATIONS

U.S. Appl. No. 63/056,440, filed Jul. 24, 2020, Sana Damani.
Brunie et al., "Simultaneous Branch and Warp Interweaving for Sustained GPU Performance", published by IEEE, pp. 49-60 (Year: 2012).
Choquette et al., Volta: Performance and Programmability, IEEE Computer Society Mar./Apr. 2018 p. 42-52.
Diamos et al., "SIMD Re-Convergence at Thread Frontiers", published by ACM, MICRO'11, Dec. 3-7, 2011, Porto Alegre, Brazil, pp. 1-12 (Year: 2011).
Han et al, Reducing Branch Divergence in GPU Programs, ACM 978-1-4503-0569-3/11/03 p. 1-8.
Han et al, Reducing Divergence in GPGPU Programs with Loop Merging, ACM 978-1-45037/13/03, p. 1-12.
CUDA Binary Utilities Version 12.2, https://docs.nvidia.com/cuda/cuda-binary-utilities/index.html#notices, Nvidia Corporation, Oct. 2023.
Word Reference.com Language Forums, "some: at least one?", Jan. 2014, 3 pages, Retrieved from the Internet< URL: https:// forum.wordreference.com/threads/some-at-least-one.2768883/ >.

* cited by examiner

```
for ( int i = 0; i < BlockSize; i++ ) {
    // divergent branch
304~if ( myThreadId == i ) {
        DoSomething();
    }
    // reconvergence point (post-dominator)
}
```

302 — `if ( myThreadId == i ) { DoSomething(); }`

306 — reconvergence point

308:
```
// converged
DoSomething() {tid=0}
DoSomething() {tid=1}
DoSomething() {tid=2}
DoSomething() {tid=3}
// reconverge
```

TIME →

FIG. 3

```
for (i = 0; i < N; i++)
{
        // prologue                          — 402
        if (divergent_condition()) {         — 404
            406 —// desired reconvergence point
            408 —// expensive code
        }
410 —// typical reconvergence point
412 —// epilogue
}
```

FIG. 4

```
foo() {
   604 ~// desired reconvergence point
   606 ~// expensive code
}
main() {
       if (divergent_condition()) { ... foo(); ... }
       else
{ ... foo(); ... }
   602 ~// typical reconvergence point
}
```

FIG. 6

```
// code template: nested loops with imbalanced work
for/while () {            // outer loop:
                          // get new work (iterations/tasks/etc.)

// prolog:   (optional) code pragma loopmerge <T>
    for () {
        // inner loop: variable trip count per thread
    }

// Reconverge: without loop merging, threads wait here

// epilog:   (optional) code
}
```

FIG. 8

```
JoinBarrier(b1);
JoinBarrier(b2);
while (...) {
        // prologue
        if (...) {
                // user-defined reconvergence point
                WaitBarrier(b2);
                // expensive loop body
                RejoinBarrier(b2);
        }
        // epilogue
}
CancelBarrier(b2);
WaitBarrier(b1); // outer synchronization
```

```
common() {
        WaitBarrier();
        // expensive code
        ...
}
foo() { ...      common();           ...        }
bar() { ...      common();           ...        }
main() {
        JoinBarrier();
        if (DivergentConditionIsTrue) {
                foo();
        } else if (!DivergentConditionIsTrue) {
                bar();

} else {
                CancelBarrier();
                ...
        }
}
```

FIG. 18

CONVERGENCE AMONG CONCURRENTLY EXECUTING THREADS

CROSS-REFERENCE TO RELATED APPLICATIONS

This application claims priority and benefit as a continuation of U.S. application Ser. No. 16/567,993, "CONVERGENCE AMONG CONCURRENTLY EXECUTING THREADS", filed on Sep. 11, 2019, now U.S. Pat. No. 11,442,795. application Ser. No. 16/567,993 claims the benefit of U.S. provisional patent application Ser. No. 62/729,929, filed on Sep. 11, 2018, wherein the contents of all the preceding applications are incorporated herein by reference in their entirety.

BACKGROUND

In multithreaded parallel execution systems, thread divergence reduces execution efficiency, and often performance. Multiple threads within a parallel-executed thread group will or might execute a common code section code eventually depending on, for example, conditional branches in the code. "Common code section" refers to a code section that is likely to be executed at some point by multiple threads in a warp or other grouping of threads. However not all threads may arrive during execution at the common code section at same point in time, which reduces the efficiency of execution. For example, when the code includes one or more loops being executed concurrently by multiple threads, the loop iteration variable or branch conditions in a loop may cause some threads to arrive at the common code section (e.g., an inner loop body) at different points in time. It is thus desirable to promote thread convergence at a common code section.

Different threads of a warp or other thread group may arrive at common code sections at different times due to divergence in the execution paths of the threads leading up to the common code section. This leads to inefficient warp occupancy.

Certain commercial graphics processing units (GPUs) organize co-scheduled sets of independent threads into groups called warps. Warps execute instructions in a Single Instruction, Multiple Thread (SIMT) manner. Whereas Single-Instruction, Multiple-Data (SIMD) architectures apply one instruction to a fixed vector of data elements using a single thread, SIMT applies one instruction to (potentially) different data in multiple independent threads in parallel. In a SIMD architecture, each instruction applies the same operation in parallel across data elements organized in a vector. SIMD is typically implemented using processors with vector registers and execution units; a scalar thread issues vector instructions that execute in SIMD fashion on each data element of the associated vectors. It is desirable in such systems to improve the thread convergence and thus execution efficiency of computer code.

BRIEF SUMMARY

Techniques are disclosed to improve execution efficiency by promoting thread convergence. Threads executing common code sections (e.g., inner loop bodies) are urged to converge using instructions inserted at strategic locations in computer code sections. In support of this various instructions and/or code markers (e.g., compiler directives, ISA extensions) are introduced: Predict, Join, Wait, Confirm, Rejoin, and Cancel. Intelligently (e.g., based on profiles and/or policies) inserting these instructions into thread bodies enables the threads in a warp or other group to cooperate with the thread scheduler (e.g., of a streaming multiprocessor in a graphics processing unit) to promote thread convergence. Herein a compiler "directive" is an instruction to a compiler, as distinguished from an ISA extension which is an instruction to execution hardware, such as a thread scheduler. For purposes of this disclosure, compiler directives and ISA extensions may be referred to and understood to be "instructions".

In one aspect, a system utilizes a code profiler or programmer-provided hints/code markers configured to insert instructions into a code segment to predict an eventual arrival of a thread executing the code segment at an execution barrier in the code segment, confirm the thread reached the execution barrier, and cancel the predicted arrival of the thread at the execution barrier in a branch of the code segment that will not encounter the execution barrier. A thread scheduler of the system is configured to execute, in parallel, multiple threads comprising the code segment, each of the multiple threads comprising the instructions inserted by the code profiler, and to suspend execution of threads arriving at the execution barrier while more of the multiple threads are predicted to arrive at the execution barrier.

In another aspect, techniques are disclosed for predicting that a set of threads in a warp of threads will reach a convergence point, delaying threads that reach the convergence point until remaining threads of the warp arrive at the convergence point or cancel arrival at the convergence point, the remaining threads being threads that have not reached the convergence point, and resuming the threads that reached the convergence point on condition of reaching a threshold value of a set of the remaining threads.

In yet another aspect, an apparatus is disclosed including logic that when operated by the apparatus results inserts, into a code segment, at least one Join instruction, further inserts, into at least one first branch of the code segment, a Cancel instruction to the Join instruction, and further inserts, into the code segment, an execution barrier at a common section of code executed by one or more branches of the code segment. The logic of the apparatus applies each of the Join instruction and Cancel instruction (as well as possibly additional instructions such as Wait etc.) to influence the operation of a thread scheduler on multiple threads executing the code segment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 depicts common code across loop iterations 300 in accordance with one embodiment.

FIG. 4 depicts a divergent code branch in a loop 400 in accordance with one embodiment.

FIG. 6 depicts a common function call 600 in accordance with one embodiment.

FIG. 8 depicts a code template 800 in accordance with one embodiment.

FIG. 18 illustrates a computer code section 1800 in accordance with another embodiment.

DETAILED DESCRIPTION

Figure 1:
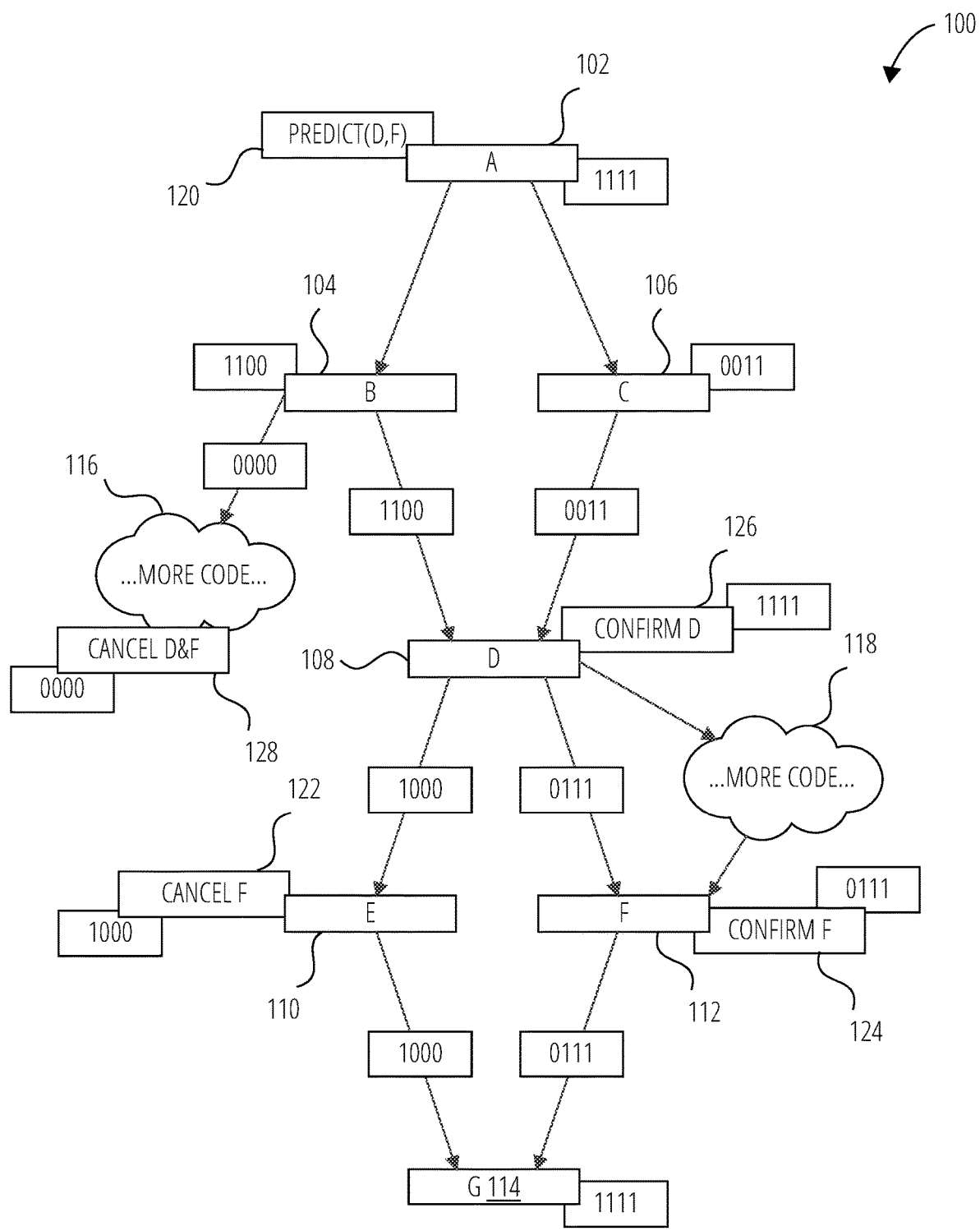
FIG. 1 depicts an execution flow 100 in accordance with one embodiment.

Maximum thread convergence on a common code section is achieved within a group of threads (e.g., a warp) when all of the threads arrive at, e.g., are ready to execute, the common code section simultaneously. Herein, 'simultaneous' is not meant literally but in the commonly understood sense of parallel programming and multithreading.

Two techniques to improve thread convergence are to either to wait for the late threads to arrive before allowing the already-arrived threads to execute the common code section, or to allow the already arrived threads to begin executing the common code section. The first approach leads to lower thread performance, and the second approach leads to greater thread divergence within the warp, which causes resource utilization inefficiency in the execution core.

The methods disclosed herein promote convergence of multiple threads in a warp or other thread grouping on a common code section. This leads to high thread convergence with less performance penalties than prior approaches.

Various terminology is utilized herein and should be accorded the following meaning, unless otherwise indicated. "Thread convergence" refers to the process of converging multiple threads to a common program counter location in a code section. One conventional approach to improve thread convergence is the use of the __syncthreads( ) instruction. Synchronization points in code can be specified by invoking __syncthreads( ) which acts as a barrier at which all threads in some defined group must wait for all in the group to arrive at, before any thread of the group is allowed to continue execution. Once the last thread of the group arrives at the barrier location, all the threads in the group continue executing more or less in parallel from that point in the code, and may gradually diverge again (thread divergence) due to differences in the data they process leading to different execution branches. Eventually, the threads may reach another barrier, and wait there to converge again. The __syncthreads( ) instruction is an example of an execution barrier that is required to be satisfied for correctness. That is, all threads must arrive exactly as indicated by the location of the __syncthreads( ) instruction in the code before they can continue executing.

The convergence barrier techniques disclosed herein may be ignored/cleared by thread schedulers more opportunistically. If less than all threads arrive at a convergence barrier, the thread scheduler can opportunistically clear the barrier to let waiting threads proceed. The disclosed techniques don't require perfectly correct "predictions" for correct execution.

"Thread divergence" refers to the execution divergence of threads that start execution together on a same instruction in some common code that all the threads are configured to execute in parallel. Divergence takes place in SIMT architectures because the data the threads operate on with the common code may vary from thread to thread, causing the threads to take different branches in the common code. "SIMT" refers to Single Instruction, Multiple Thread, a type of instruction execution architecture. In a SIMT architecture, rather than a single thread issuing vector instructions that are applied to data vectors, multiple threads issue common instructions to unstructured (not formed into vectors) data. A SIMT architecture enables each thread to access its own registers, to load and store data from divergent addresses, and to follow divergent control flow paths. The compiler and the processor (e.g., a GPU) work together to ensure the threads of a warp execute the same instruction sequences together as frequently as possible to maximize performance. This is known as improving or optimizing thread convergence.

"Warp" refers to a group of two or more threads that overlap in their scheduled execution time. "Thread" refers to an atomic unit of execution from a scheduling perspective. In other words, a thread is the most basic unit of execution parallelism on a data processing architecture. Threads may be grouped into larger units of parallelism, such as warps, blocks, and grids, for example on Nvidia architectures.

"Computer code" refers to any of source code, object code, or executable code. "Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions. "Machine language" refers to instructions in a form that is directly executable by a programmable device without further translation by a compiler, interpreter, or assembler. In digital devices, machine language instructions are typically sequences of ones and zeros. "Compiler" refers to logic that transforms source code from a high-level programming language into object code or in some cases, into executable code. "Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Module" refers to a computer code section having defined entry and exit points. Examples of modules are any software comprising an application program interface, drivers, libraries, functions, and subroutines. "Driver" refers to low-level logic, typically software, that controls components of a device. Drivers often control the interface between an operating system or application and input/output components or peripherals of a device, for example. "Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system. "Application program interface" refers to instructions implementing entry points and return values to a module. "Computer code section" refers to one or more instructions.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code. "Interpreted computer code" refers to instructions in a form suitable for execution by an interpreter. "Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Programmable device" refers to any logic (including hardware and software logic) who's operational behavior is configurable with instructions. "Object code" refers to the computer code output by a compiler or as an intermediate output of an interpreter. Object code often takes the form of machine language or an intermediate language such as register transfer language (RTL). "Source code" refers to a high-level textual computer language that requires either interpretation or compilation in order to be executed by a device.

"Thread scheduler" refers to logic that controls the execution of threads, including pausing and resuming said execution of the threads. "Execution barrier" refers to an instruction or program counter in code that, upon being encountered during execution of a thread, causes the thread to suspend execution until some condition is met. The extended instructions/primitives described herein enable the creation of execution barriers that the thread scheduler is not required to enforce. Rather, the instructions/primitives may be treated as "convergence hints" by the thread scheduler, to provide improved execution efficiency/warp occupancy.

"Code profiler" refers to logic to analyze code and determine execution characteristics of the code, such as computationally expensive segments of the code, common segments of the code, and divergent branches of the code.

There are several situations that may arise during concurrent thread execution.
1. The threads are already converged in their execution, in which case no additional convergence promotion is helpful.
2. The threads are diverged in their execution. There are two variations of this situation.
   Some of the threads never execute the common code section. Additional convergence promotion is not helpful because there is no common code section to converge upon.
   The threads may, at some point during their execution, execute the common code section. In other words, the common code section is present on each of the potential execution paths of the threads, taking future branch points in their execution flow into account. The probability that the threads will all execute the common code section in the future could be as high as 100% if there are no undetermined branch conditions in any thread between the thread's current execution location and the common code section (and the execution flow for each thread is thus determined to arrive at the common code section). If some branch conditions in the execution path of any thread are undetermined, the probability of all the threads executing the common code section is some value $P >= 0$.

The methods herein utilize signaling to the warp execution scheduler to indicate that execution within a particular thread has reached a location from which convergence/reconvergence of the threads in a warp may be promoted.

At a high level, the methods involve:
1. Predicting arrival at a given location (e.g., a program counter (PC)) within a thread;
2. Confirming arrival of the thread at the given PC; and
3. Canceling the prediction of arrival of the thread at the given PC.

These actions provide indications as to whether threads will converge on a common code segment.

In one aspect of an improved method, Predict may be implemented as an instruction (e.g., an instruction set architecture (ISA) extension—"Predict instruction") that enables hardware to explicitly track membership of an expected set of threads in a group that will execute a common code section (e.g., inner loop code section).

Predict will "predict" that a particular region of code will be reached and will execute. For example, in the ISA of the Nvidia Volta GPU, Predict can be implemented as a BSSY instruction that joins a particular barrier ("Join instruction"). The use of Predict or Join results in a constructive thread convergence barrier. Convergence barriers are for performance, not correctness, and are not guaranteed to be honored. Predictions may be incorrect, so similarly to convergence barriers may not come true. The thread scheduler induces control transfer (e.g., to another shard in the warp) if the threads predicted to arrive at the common code section have in fact not yet arrived.

The improved techniques utilize Confirm ("Confirm instruction", e.g., as an ISA extension) to enable the thread scheduler to explicitly track the actual set of threads that arrive at a common code section. Like a convergence barrier, Confirm acts like a barrier to thread execution. Confirm indicates that a prior prediction has come true; that is, a region of code that was predicted to execute was, in fact, executed. In the Volta ISA on graphics processing units from NVidia, for example, confirm can be implemented with B SYNC, tracking arrival at a particular barrier (the same barrier ID as joined by the associated Prediction/Join).

Using Confirm, the hardware thread scheduler can compare confirmed thread arrivals against predicted thread arrivals to determine if a warp is optimally converged, and to then take appropriate scheduling action to promote thread convergence.

The Cancel operation ("Cancel instruction", e.g., an ISA extension) rescinds an arrival prediction. It acts to signal from one set of threads (where a set can have N>1 threads) to another that a prediction is canceled. For common nested loop sections, Cancel may be used to signal if threads will rejoin, or not. The Cancel signal for a thread informs the thread scheduler not to wait for the canceled thread any longer.

On SIMT architectures each thread may branch independently depending on the evaluation outcome of a branch condition resulting in thread divergence. Performance in SIMT architectures relies on high levels of parallel execution of common code sections by multiple threads within a warp which is quantified using a metric known as SIMT efficiency. Branches in the execution flow of a code section may be uniform or divergent. At a uniform branch, all threads evaluate the branch condition identically, that is, either all threads in the warp execute the taken path or all threads execute the not-taken path. When threads in a warp encounter a divergent code branch that is evaluated differently by different threads, the warp is said to have diverged. "Divergent code branch" refers to a code section that is not always executed at some point by all threads in a warp or other grouping of threads. A divergent code branch is executed conditionally, based on conditions evaluated at runtime. On SIMT architectures the hardware serializes the execution of threads executing the taken and not-taken paths of the divergent code branch. When the execution paths of the divergent code branches again merge at a common code section, the compiler synchronizes the threads in the warp so that they resume parallel execution.

Thread convergence opportunities exist when multiple threads eventually execute a common code section, but not all threads arrive at the common code section at the same time, resulting in serialized, duplicate execution of the common code section. This problem extends to subsections of common code sections, such as function calls and loop bodies. Convergence is promoted by facilitating threads that execute common code sections to arrive and pause execution (wait) at the beginning of common code sections before enabling execution of the threads to proceed together.

In one embodiment, expensive code sections executed by diverged threads are identified and optimistic thread synchronization is carried out by collecting threads across loop iterations, or across divergent code branches, before executing common code sections to improve SIMT efficiency. A programmer or compiler/code profiler may provide hints to identify common code sections within the program for the thread scheduler to implement execution barriers to manage thread reconvergence. In one scenario, programmer-specified thread synchronization points are identified, a compiler algorithm inserts barrier instructions based on the synchronization points, an inter-procedural analysis is carried out to handle function calls used by common code sections, and a dynamic execution/convergence barrier (which may be a soft barrier) is utilized to pause execution of threads at the boundaries of convergence barriers.

Divergent threads may execute disjoint sequences of code with no commonality, or divergent threads may eventually execute some common code sequences, just not aligned in time. The second category, comprising periods of divergent execution where threads within the same warp might eventually execute common sequences of code, provides opportunities for SIMT efficiency that are not met by conventional post-dominator based reconvergence approaches. Broadly, two subclasses of code exhibit opportunity for further improvement in parallel execution efficiency on SIMT platforms: code that is common across diverged paths, including common function calls, common subsequence or irregular control flow, and divergently executed code that is common across loop iterations, such as a divergent branch or an imbalanced inner loop (an inner loop body that is executed a different number of times by different threads) within an outer loop.

Figure 5:
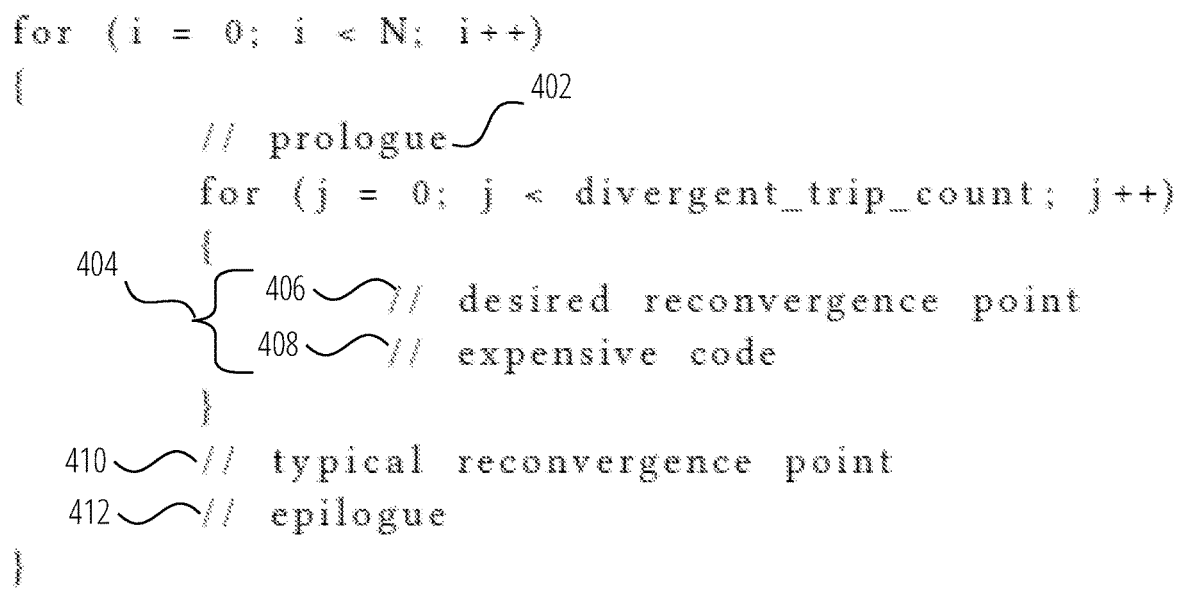
FIG. 5 depicts loop iteration count divergence 500 in accordance with one embodiment.

FIG. 4-FIG. 6 illustrate example code patterns with regions of divergent control flow execution comprising common code. Conventional compiler-inserted reconvergence points, located at post-dominators, do not necessarily maximize run-time convergence for these patterns. Instead of waiting for guaranteed reconvergence at post-dominators, threads may instead be caused to reconverge opportunistically at earlier (preceding) points in the execution flow. In each example, an alternative synchronization configuration may improve runtime convergence and thus warp performance.

Additional techniques are also disclosed herein to improve execution convergence by enabling placement of convergence synchronization hints at unconventional locations in the code. These locations are places where reconvergence is possible, but is not guaranteed.

To specify these reconvergence hints two elements of information are utilized to cause thread synchronization:the predicted location for reconvergence and the region of code (or scope) where this prediction should apply.

The latter parameter is important to identify synchronization that works across nested loop boundaries. These two parameters may be specified by the programmer or discovered automatically by a compiler or a runtime code profiling tool.

The first parameter enables a potential reconvergence point to be specified. For programmer-directed reconvergence, this location may be specified using a code label in the source code. The second parameter specifies which threads are considered to be candidates for reconvergence at the predicted location. Threads that enter the specified region will attempt to honor the predicted reconvergence point, and threads that leave the region are no longer considered candidates for reconvergence. The prediction region may in one embodiment be specified by a Predict (<label>) directive (distinguished from the Predict instruction) that associates the prediction with a specific labeled location (code label) for reconvergence. The region ends where all threads are no longer able to reach the code label. Explicit scope markers (again, using code labels, source code scope markers such as "{ }", or ISA extensions, for example) at the beginning and end of the prediction regions may be applied in some embodiments. The two parameters specify the following (e.g., to a compiler):

All threads within the prediction region should reconverge, when possible, at the predicted synchronization point.

Threads that leave the prediction region should opt out of reconverging at the predicted thread convergence location (so that other threads don't wait for them there).

Programmer-specified convergence hints should receive priority over any compiler or code profiler generated convergence instructions that might conflict (e.g., compiler-inserted reconvergence points at branch post-dominators). Similarly, code profiler generated convergence hints should be prioritized over compiler convergence instructions.

The following description may use certain acronyms and abbreviations as follows:

"DPC" refers to a "Data Processing Clusters";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "Raster Operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Referring now to FIG. 1, an exemplary execution flow 100 for a set of threads depicts use of Predict, Confirm, and Cancel. The execution flow 100 comprises various execution points (e.g., PCs) represented by A-G (numbered respectively block 102, block 104, block 106, block 108, block 110, block 112, and block 114). Other possible computer code sections that may be executed in the execution flow 100 are code section 118 and code section 120. Each branch is also associated with a mask, indicating (with a "1") which threads execute the branch, and (with a "0") which threads do not execute the branch. For simplicity of example, the masks represent four threads, although in practice many more threads might occupy a thread group, e.g., a warp may comprise 32 threads.

At point A, each thread includes logic (Predict(D,F) 116) to make a prediction of whether the thread will execute D and F. This represents a prediction that the execution flow 100 of a thread will take the execution path A→(B or C)→D (for common code section D) and one of A→(B or C)→D→F or A→(B or C)→D→code section 118→F (for common code section F). The prediction for D or F or both may vary from thread to thread, due to each thread operating on different data sets.

As noted, the execution flow 100 comprises common code sections that may be executed by multiple threads. The predicted-to-execute common code sections are D and F.

Once a particular thread reaches D, it executes an instruction confirming arrival at D (Confirm D 126). Likewise when a particular thread reaches F, it executes an instruction confirming arrival at F (Confirm F 124).

If a thread executes onto a branch that cannot reach a common code section it executes a Cancel on the unreachable common code section. For example, Cancel D&F 128 is executed once a thread branches to code section 116. Likewise, a thread executes Cancel F 122 when it branches from block 108 (D) to bypass common code section F.

The following code listing is an example of use of Predict, Confirm, and Cancel to cause threads in a warp to converge on an inner loop.

```
for/while ( ) {   // outer loop, get new work/iterations/tasks/etc.
    // prolog: some code(optional)
    PREDICT(InnerLoop), aka BSSY B<N>   // this thread predicts it will execute
InnerLoop
    for ( ) {   // inner loop, variable trip count per thread
        InnerLoop:
        CONFIRM(InnerLoop), aka BSYNC B<N>   //this thread indeed executes
InnerLoop, joins others here
        // inner loop body: some code
        PREDICT(InnerLoop), aka BSSY B<N>   //this thread predicts it will execute
InnerLoop again
    }
    // typical sync point here eliminated
    // arriving here, this thread may or may not execute the InnerLoop again
    // not enough information; prior prediction stands
    // epilog: some code(optional)
}
CANCEL(InnerLoop), aka BREAK B<N>   // this thread isn't going back to
InnerLoop, signal others not to wait
    // resynchronize here as needed
```

A Confirm of a Predict may, in some embodiments, induce a control transfer to another thread via the thread scheduler if set of Predicted threads!=set of arrived (Confirmed) threads. Threads that Cancel a Predict may simply proceed with execution. Eventually, threads waiting at a common code section (e.g., inner loop code body) will be reactivated by the thread scheduler and recognize that set of Predicted threads==set of Confirmed threads. In some embodiments, another execution barrier may be inserted after a Cancel to ensure timely reconvergence.

In one embodiment a "soft barrier" may be created in a thread group (e.g., in a warp). "Soft barrier" refers to a dynamic execution barrier that is responsive to a configurable threshold setting, such that threads paused at the barrier are released to continue execution once the threshold number of threads arrives at the soft barrier (vs waiting for all threads that joined the barrier to arrive). Threads arriving at the soft barrier may be held there, until some number of threads (the threshold value) have confirmed. A threshold value herein refers to any condition that can be evaluated as true or false by a thread scheduler.

In another embodiment, execution barriers are enabled by JoinBarrier, WaitBarrier, and CancelBarrier instructions in the code sections executed by threads. For example, in some SIMT architectures execution barriers may be created as follows:

JoinBarrier: Threads join a specified barrier to wait at a subsequent convergence point (e.g., using the BSSY instruction on Nvidia® Corp SIMT architectures).

WaitBarrier: Threads wait on all participating threads to arrive at the convergence point before clearing the specified barrier (e.g., using the BSYNC instruction on Nvidia® Corp SIMT architectures).

CancelBarrier: Threads that do not reach the convergence point can leave the barrier (e.g., using the BREAK instruction on Nvidia® Corp SIMT architectures). This is used to handle non-standard convergence points such as in loops or in short-circuit code.

The programmer, compiler, or code profiler inserts the JoinBarrier instruction at the beginning of the divergent region. The post-dominator block (PDOM) of the divergent branch is the typical reconvergence point where the compiler or programmer inserts a WaitBarrier. All threads that enter the divergent region wait at the execution barrier thus created before being released by the thread scheduler to execute the subsequent code in parallel. Once a threshold number of threads have confirmed, the barrier is cleared by the thread scheduler (until a next iteration of a loop, for example) to release the threads waiting there. "Post-dominator" refers to the conventional meaning of the term from graph theory—a point or node in a code section through which execution must flow from preceding instructions in potentially divergent code sections.

The following code listing illustrates an example of use of a soft barrier.

```
while( )  { // outerloop
    predict A    // inner loop barrier
    predict B    // barrier to collect threads that complete the inner loop early
    for( )  { // inner loop
        confirm A   // execute the inner loop, but wait if all jointers of barrier A have not arrived
        DoinnerLoop( )
        predict A    // predict thread will execute the inner loop again
    }
    predict C   // escaped inner loop. join barrier C to track other threads that escaped the inner loop
    // once p (soft barrier) becomes true, wake other waiting threads and execute together with them
    p = threshold(T)   // p: false, then wait, p: true then wake up (attempt merge)
    !@p cancel A   // allow inner loop to proceed without these threads, and wait for more threads
    @p BMOV B, C  // p: true, reset barrier B so only threads who joined C are required to arrive at B now
        // (the rest are waiting at A)
    confirm B   // wait for other escaping threads here until enough (but not all) threads arrive
        // if p was false, confirm and sleep (barrier catching all threads here)
        // if p was true, confirm and complete the barrier (barrier was reset to catch only C)
        // now converged with any other threads that arrived prior
    cancel C   // clear out the set of threads that predicted C, and never sync at C
    }
    // return True if count of threads that have exited the inner loop exceed threshold T
    // else return False
    threshold (T):
        arrived= popc(C)   // count of threads that Predicted C
        if arrived> T, return true, else return false
```

Figure 2:
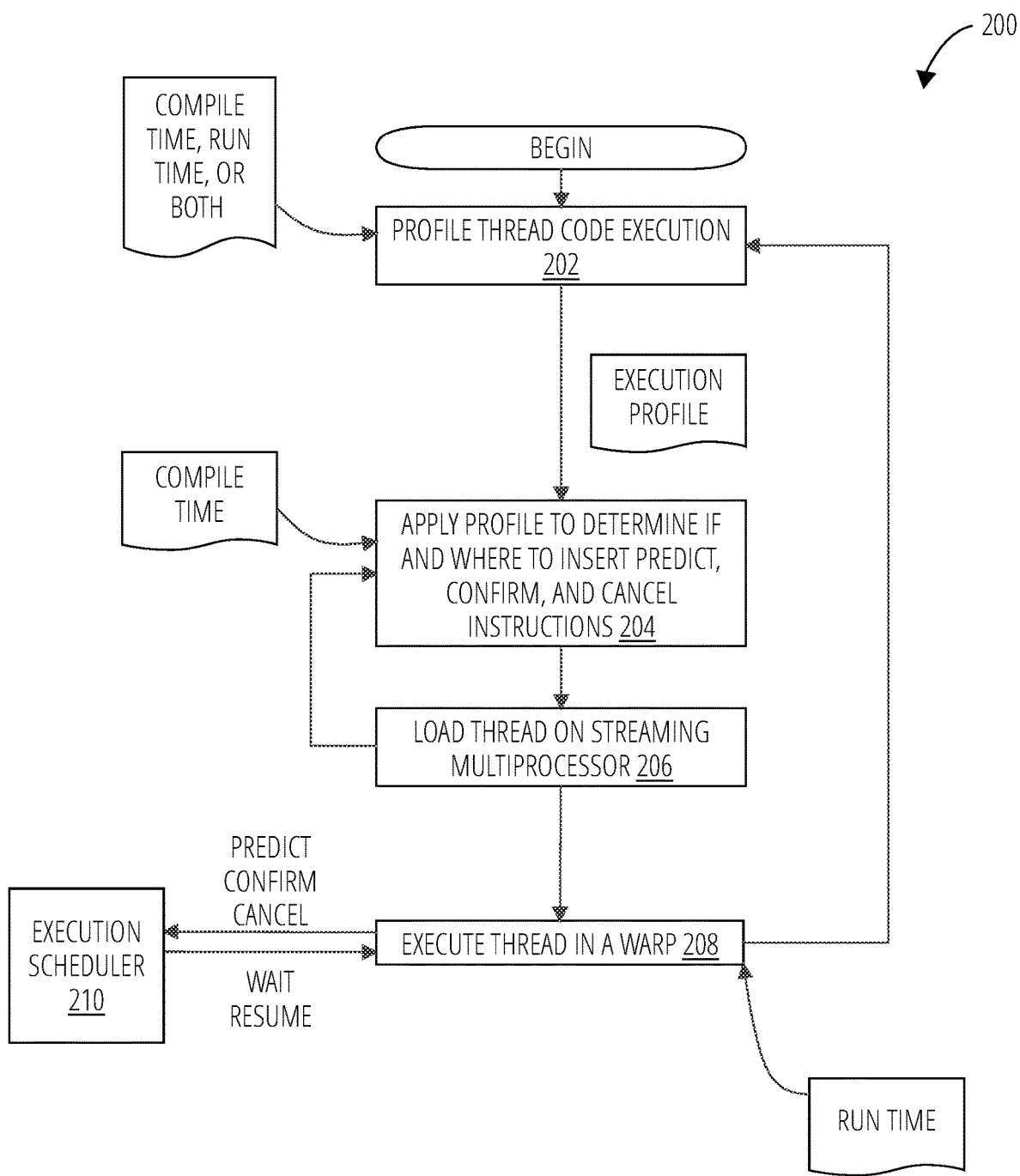
FIG. 2 depicts a thread profiling and execution process 200 in accordance with one embodiment.

Referring to FIG. 2, a thread profiling and execution process 200 begins with an optional profiling of the execution behavior of a thread (block 202) by a code profiler. The optional execution profiling may be carried out by a compiler prior to executing the thread, or at runtime using a runtime execution profiler, or a combination of the two.

Next, the execution profile (or a predetermined execution policy if no profiling is done) is applied (block 204) to determine where in the thread to insert Predict, Confirm, and Cancel instructions. This may occur at compile time, load time, or a combination of both.

The thread is loaded on a streaming multiprocessor (block 206) or other parallel execution hardware. The loaded thread is executed in a warp (block 208) or other grouping and interacts, via the Predict, Confirm, and Cancel instructions, with the execution scheduler 210 (e.g., comprising a thread scheduler), which controls the execution of the threads (e.g., causes their execution to wait and resume) to promote convergence of the threads on a common code section.

Various scenarios for thread execution that result in thread divergence will now be described.

Two thread execution scenarios are (1) a common code section across loop iterations, and (2) a common code section across divergent code branches. FIG. 3 depicts an example of common code across loop iterations 300. The loop comprises a common code section 302 (DoSomething( )) with a divergent code branch 304 that evaluates to TRUE (i.e., is taken) in a different iteration for each of many threads all with different thread IDs 308. Each thread eventually executes the "taken" path of the divergent code branch 304 but does so independently, while the other threads wait idle. The common code section 302 is therefore serially executed. Instead of re-converging at the post-dominator of the divergent code branch 304 where all threads are guaranteed to arrive before executing the next iteration of the loop, it may be more efficient to wait for all threads to arrive at body inside the if block (just before DoSomething( )) before executing the common code section 302. This would enable thread synchronization at the common code section 302 by deferring the progress of some threads within the warp. "Thread synchronization" refers to the process of aligning thread execution to proceed in sync from a particular instruction in a common code section.

FIG. 4 depicts an example of a divergent code branch in a loop 400. Multiple threads all execute the prologue common code section 402 prolog code and eventually execute the expensive code section (e.g., nested loop) in the if statement comprising the divergent code branch 404 but do so at different iteration counts of the loop. "Expensive code section" refers to a computation-intensive code section, for example, an inner loop. Conventional reconvergence techniques synchronize all threads at the post-dominator 410 of the divergent code branch 404, executing any epilogue common code section 412, before executing the prolog common code section 402 for the next loop iteration. Hence, the execution of the expensive code section 408 remains serialized across loop iterations, resulting in poor utilization of parallel hardware execution resources, for example in the SM of a graphics processing unit.

An improved synchronization scheme collects multiple threads across different iterations of the loop before executing the conditional code inside the divergent code branch 404. Threads wait at the new reconvergence point 406 at the start of the expensive code section 408 for all (or a threshold number of) threads to arrive before the threads resume execution in parallel. In this example, there is no else condition to execute. In cases where multiple execution choices exist (e.g., if . . . else statements), it may be preferable to reconverge in the expensive code section 408 (e.g., the if condition is TRUE) while allowing diverged execution of less expensive paths (e.g., the else condition).

FIG. 5 depicts an example of loop iteration count divergence 500. The code comprises a nested loop with a non-uniform iteration count across threads of a group. In other words, different threads exit the inner loop at different iteration counts (divergent_trip_count variable is non-uniform in value across different threads). Conventionally, threads that exit the inner loop early wait at the post-dominator 410 synchronization point for all threads to arrive before executing the common code section 412 and beginning the next iteration of the outer loop, where threads once again execute the common code section 402 and begin to execute the inner loop in a synchronized manner. "Synchronization point" refers to an instruction in a code section at which threads of a group pause execution until execution by all the threads in the group is synchronized on the instruction. The inner loop body is therefore common across iterations of the outer loop.

A conventional compiler may attempt to reconverge at the earliest possible point where all threads are guaranteed to arrive, i.e. at the inner loop post-dominator 410. However, this means that the warp executes some iterations of the inner loop divergently.

A more efficient scheme executes the inner loop convergently by collecting threads across iterations of the outer loop, especially if the inner loop body is expensive. This solution ensures parallel execution of the common expensive code section 408, but the prologue common code section 402 and epilogue common code section 412 of the loop which were previously executed in a convergent manner are now executed divergently. Hence, the efficiency of this technique is dependent on specific code properties such as the execution cost of the common code section in aggregate. Programs that have a non-nested divergent loop may be modified using thread coarsening into nested loops which can then be optimized using the more efficient scheme. In other words, N threads executing the divergent loop may be combined into a single task with an N-iteration outer loop, and a divergent inner loop. This situation may be common in environments where many (e.g., thousands) of independent tasks/threads are executing or scheduled to execute at the same time, and the thread scheduler distributes work across many parallel execution pipelines.

FIG. 6 depicts an example of a common function call 600 used in two divergent code branches. Both the taken and not taken paths of the branch call the function foo( ), i.e., the function call body is common across all paths of the divergent branch. All threads in the warp will eventually execute foo( ), but not in synchronization. A conventional compiler fails to enforce thread convergence at the function body because the calls to foo( ) are made from different locations in the program and existing post-dominator based execution flow analysis fails to recognize this function body as a potential reconvergence point. To improve SIMT efficiency within the function body, an improved technique ensures that all threads reconverge at the new reconvergence point 604 at the expensive code section 606 of the function and execute the body in parallel. Unlike previous examples, synchronization within the function body does not impact effects of the compiler inserted synchronization point at the post-dominator 602.

Figure 7:
FIG. 7 depicts a computer code section 700 comprising nested loops of variable iteration count in accordance with one embodiment.

FIG. 7 depicts a computer code section 700 with compiler directives to specify a potential reconvergence point at the beginning of the inner loop body within nested loops of variable iteration count.

In a conventional SIMT execution flow, threads begin execution of the outer loop together, executing any intermediate code (labeled epilog( )), before beginning execution of the inner loop. Then, threads will wait at the inner loop post-dominator until all threads complete their inner loop iterations. Threads then proceed together, executing any intermediate code (labeled prolog( )), then beginning execution of the next outer loop iteration.

A more efficient approach synchronizes thread execution at the beginning of the inner loop. When some threads run out of work in the inner loop, the remaining threads wait in the inner loop while a subset of threads leave to execute any epilog code, begin a new outer loop iteration, execute any prolog code, and finally rejoin with threads waiting in the inner loop. The threads now proceed inside the inner loop in sync, with a higher execution efficiency.

To enable thread convergence at the top of the inner loop rather than at the inner loop post-dominator, threads arriving at the inner loop post-dominator are allowed to "slip past" rather than waiting. Directives to the compiler cause existing convergence synchronization to be compatible with the programmer-provided reconvergence hints. This process is described in detail further below.

In one embodiment the thread scheduler waits for all threads to arrive at a predicted convergence point before allowing execution of threads at the convergence point to proceed. This attempts to maximize reconvergence at the predicted location. However, maximizing convergence may not always be the best choice. As convergence is increased at the specified location, serialized executions of other portions of code may consequently be increased (e.g., of the prolog end epilog code sections of the computer code section 700). In the case of loop merging, depending on the relative cost of these sections with the inner loop, this alternate synchronization pattern may not be profitable.

To help address this tradeoff, an optional tuning parameter (see FIG. 8) is introduced that may be supplied with the predicted reconvergence point. This parameter, a threshold, trades off the cost of waiting for more threads to arrive vs. the cost of executing at lower SIMT efficiency. Execution may proceed at sub-maximal SIMT efficiency until enough threads go idle to amortize the cost of refilling them with new work.

In one embodiment as depicted in the code template 800 of FIG. 8, a compiler pragma (a type of compiler directive) is utilized to cause the automatic insertion of convergence hints around inner loop logic blocks or other areas of potential thread convergence. The code template 800 may be utilized to recognize code patterns that may benefit from use of convergence hints.

Figure 9:
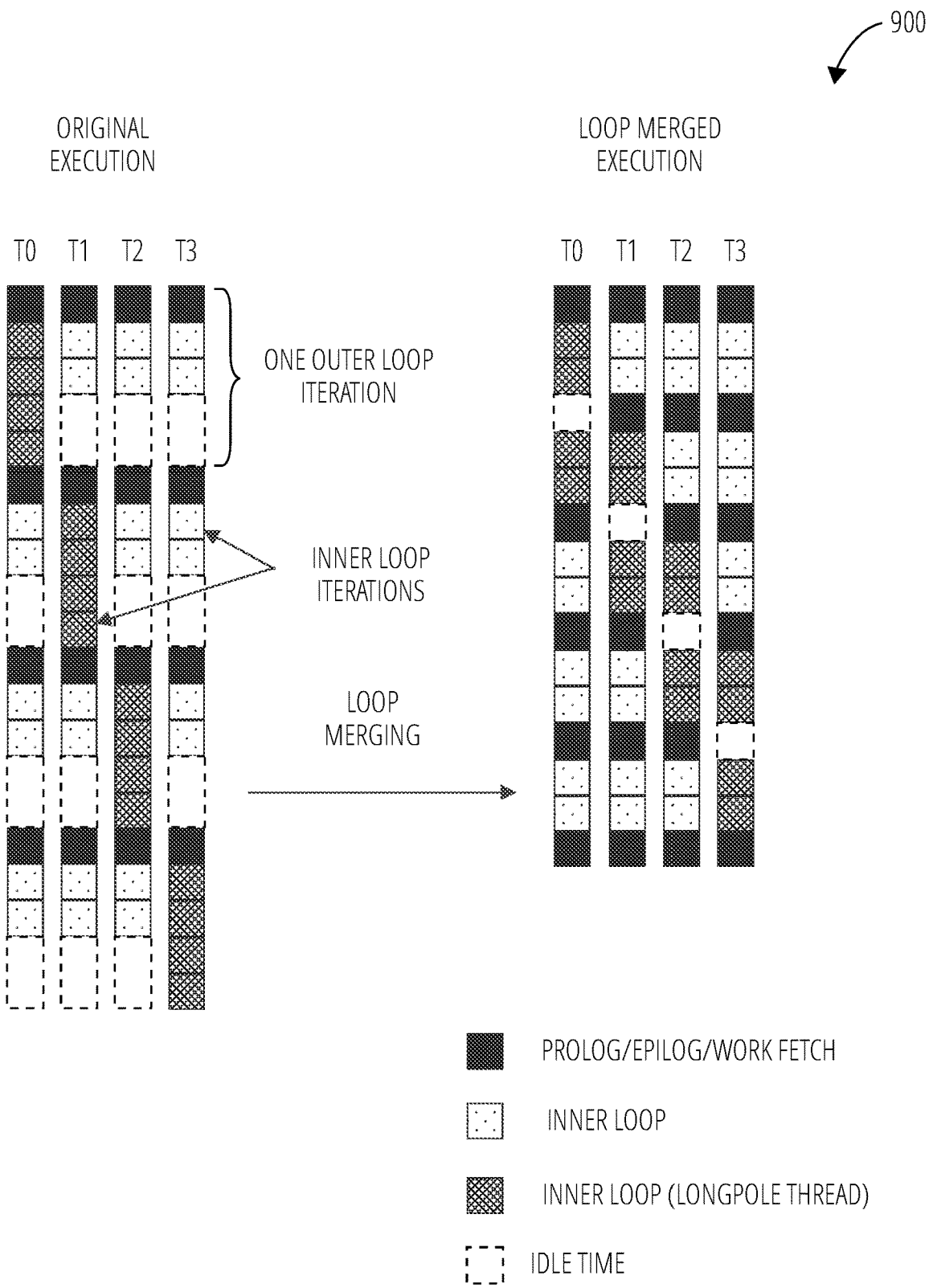
FIG. 9 depicts thread convergence improvement 900 in accordance with the code template 800.

In one embodiment, a programmer selects a wait time and/or the count T, and/or inserts the Predict/Confirm/Cancel instructions. In other embodiments, static or dynamic execution profiling may be utilized to predict the length of the wait and/or the count T to apply to establish greater convergence among threads. Likewise, a compiler, or a runtime code profiler, may be utilized to determine when and where to insert Predict/Confirm/Cancel instructions and/or soft barriers into code sections. Compiler stage or runtime execution profiling can help establish under what conditions thread reconvergence is more helpful than not for execution efficiency. FIG. 9 depicts thread convergence improvement 900 that may be achieved utilizing the code template 800 on applicable code patterns.

Synchronization primitives (also referred to as instructions or directives) may be systematically utilized to insert and modify execution barriers to influence thread convergence in a warp or other thread group. Three primary steps are involved:

Identify a region where threads are predicted to reconverge.

Insert synchronization instructions that create an execution barrier at an entry boundary of the region and which enable threads exiting from the region to opt-out (cancel their membership in) the execution barrier.

Handle conflicts between compiler-inserted post-dominator barriers (e.g., those inserted by conventional compilers) and the barriers introduced by the new optimizations described herein, a process referred to herein as deconfliction.

To avoid unintended alterations of the execution flow of code after execution barrier insertion, the execution barrier hint insertion may be performed after all control flow optimizations by the compiler are carried out, including predication and loop unrolling. Execution barrier hint insertion may also be carried out in a unified compiler pass or process as well. Execution barrier hints may also require register allocation, another reason to perform the barrier insertion optimizations before final compiler passes.

The following synchronization primitives may be utilized by the compiler or other code profiler to achieve the thread execution optimizations described herein:

JoinBarrier: (Join instruction) Joins the thread to an execution barrier. Threads that join the barrier expect to wait on the barrier at a subsequent convergence point. This is similar to the Predict instruction.

WaitBarrier: (Wait instruction) Causes the thread to suspend execution at the execution barrier that it joined, until all or a threshold level of threads to arrive at the barrier, at which point the thread passes the barrier and continues execution.

CancelBarrier: (Cancel instruction) Removes the thread from a barrier that it Joined. Threads that exit the region without waiting on the barrier cancel their expected wait at (membership in) the barrier so that other threads don't wait for them at the barrier.

RejoinBarrier: (Rejoin instruction) Indicates that a thread that has cleared a barrier expects to wait on the barrier again.

At this point, it is helpful to review the various instructions/directives/pragmas described thus far and how they relate to one another in various embodiments.

Predict/Confirm/Cancel may be understood to refer to low-level ISA instructions, not compiler directives. They are names for new ISA instructions (extensions) or alias names for existing ISA instructions, depending on the implementation. The Predict instruction may for example be implemented with convergence/execution barriers using JoinBarrier. The Confirm instruction may be implemented with convergence barriers using Wait Barrier. The Cancel instruction may be implemented with convergence barriers using CancelBarrier/JoinBarrier/WaitBarrier/RejoinBarrier are a different friendly naming of the convergence barrier hints to convey the intended functionality without necessarily implying a corresponding ISA instruction. In other words, these may also map 1:1 to ISA instructions, but could be equivalently implemented in other ways (e.g., using multiple ISA instructions per hint). RejoinBarrier is functionally the same as JoinBarrier but named differently for clearer explanatory purpose.

Predict(converge_point) includes a parameter (one or more) specifying the location of predicted reconvergence point(s). "Predict(convergence_point)" is used by a programmer, code profiler, or other tool to convey intent about where reconvergence should occur to the compiler. In other words, it may be understood to be a compiler directive. Predict(convergence_point) further conveys the region or scope for which the predicted reconvergence point applies in; threads that leave the region or scope remove themselves from the convergence barrier. When the compiler directive Predict(converge_point) is specified, the compiler itself takes care of inserting any other instructions needed to implement convergence barriers in the code. The programmer or analysis tool need only specify the Predict( ) directive itself and the marked/labeled reconvergence point in the code.

Figure 10:
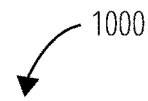
FIG. 10 depicts a computer code section 1000 in accordance with another embodiment.
Figure 11:
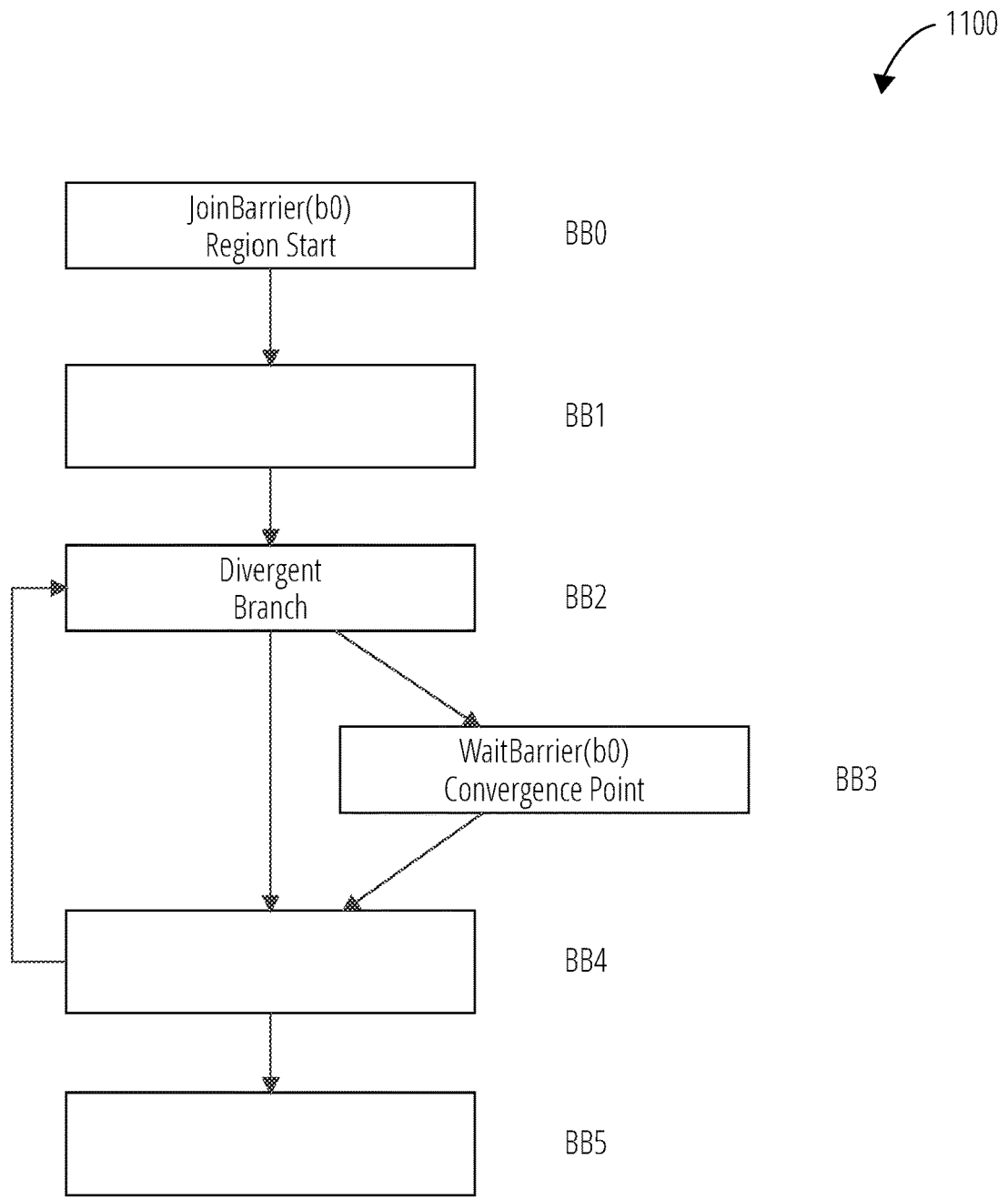
FIG. 11 depicts an execution flow 1100 in accordance with one embodiment.

In the computer code section 1000 depicted in FIG. 10, threads join barrier b2 (JoinBarrier) before entering the loop region. They wait (WaitBarrier) at the predicted reconvergence point inside the if condition. Threads exiting the loop (e.g., without reaching the if inner body) clear the barrier (CancelBarrier) to indicate to any remaining waiting threads that they no longer need to await arrival of the exiting thread, and threads that pass the barrier from inside the if body expect to wait at the same barrier in the next iteration, and therefore rejoin the barrier (RejoinBarrier). Another barrier (b1) may also be placed outside the loop, providing a second level of thread synchronization.

FIG. 11-FIG. 14 depict defined region start and reconvergence points at blocks BB0 and BB3, respectively. The JoinBarrier and WaitBarrier instructions are inserted at the region start and reconvergence points, respectively. The compiler preserves this information through any control-flow altering optimizations prior to the synchronization pass. An additional analysis is then carried out to determine the optimal positioning of the CancelBarrier and RejoinBarrier primitives within the region. The compiler algorithm to perform these functions utilizes two inputs: (1) whether or not a thread is a member in an uncleared barrier, and (2) whether or not a thread expects to wait on the barrier. The compiler ensures that a thread that expects to wait on a barrier that it has already cleared rejoins the barrier, and that a thread that has joined the barrier and that exits the defined region without waiting on the barrier must clear (Cancel) it to enable the remaining threads still waiting on the barrier to proceed with execution. Utilizing this information and control flow analysis techniques, the compiler can insert the JoinBarrier, WaitBarrier, RejoinBarrier, and CancelBarrier instructions in the appropriate locations in the code.

For example, a modified form of initialized variable analysis may be applied to decide whether a thread is part of a barrier. When threads join a barrier using the JoinBarrier primitive, the barrier is said to be initialized. A barrier is considered uninitialized once it is cleared.

The following dataflow equations represent initialized barrier analysis. In the execution flow 1100 of FIG. 11, the barrier at BB3 is initialized at OUT(BB0) and uninitialized at OUT(BB3).

Gen($BB$)=JoinBarrier

Kill($BB$)=WaitBarrier

IN($BB$)=∩(OUT($p$)|∀$p$∈predecessors($BB$))

OUT($BB$)=(IN($BB$)−Kill($BB$))∪Gen($BB$)

It is next determined whether or not a thread expects to wait on a barrier. This determination is made using standard backward-liveness analysis to compute the set of blocks where the barrier is "live". The "liveness" of the barrier register is set at a use of the barrier (WaitBarrier), and the liveness of the barrier register is unset ("killed") at the point of initialization (JoinBarrier).

Gen($BB$)=WaitBarrier

Kill($BB$)=JoinBarrier

IN($BB$)=(OUT($BB$)−Kill($BB$))∪Gen($BB$)

OUT($BB$)=∪(IN($s$)|∀$s$∈successors($BB$))

The dataflow equations for live barrier analysis are as follows:

Gen($BB$)=WaitBarrier

Kill($BB$)=JoinBarrier

IN($BB$)=(OUT($BB$)−Kill($BB$))∪Gen($BB$)

OUT($BB$)=∪(IN($s$)|∀$s$∈successors($BB$))

Figure 12:
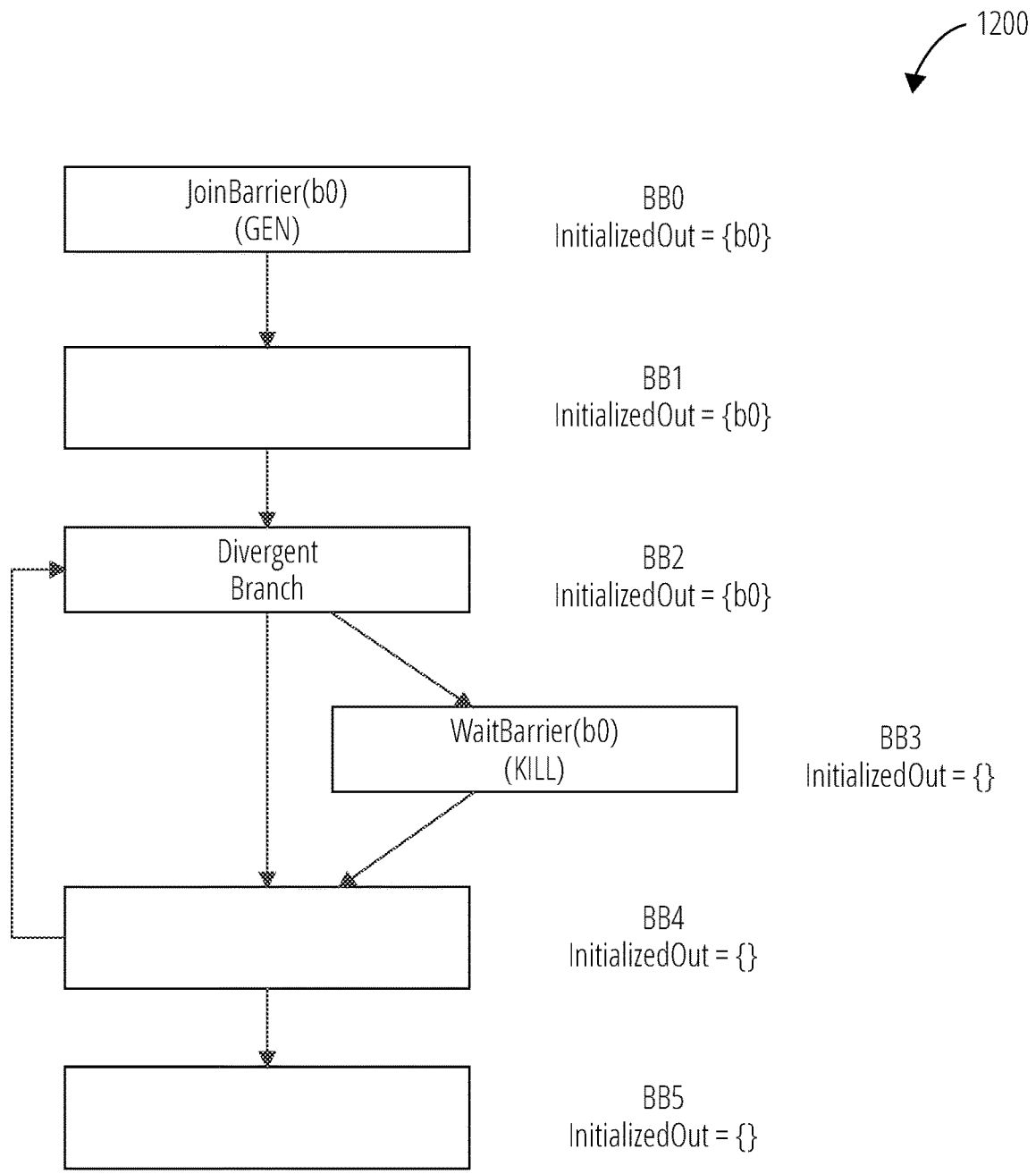
FIG. 12 illustrates an execution flow 1200 in accordance with another embodiment.
Figure 13:
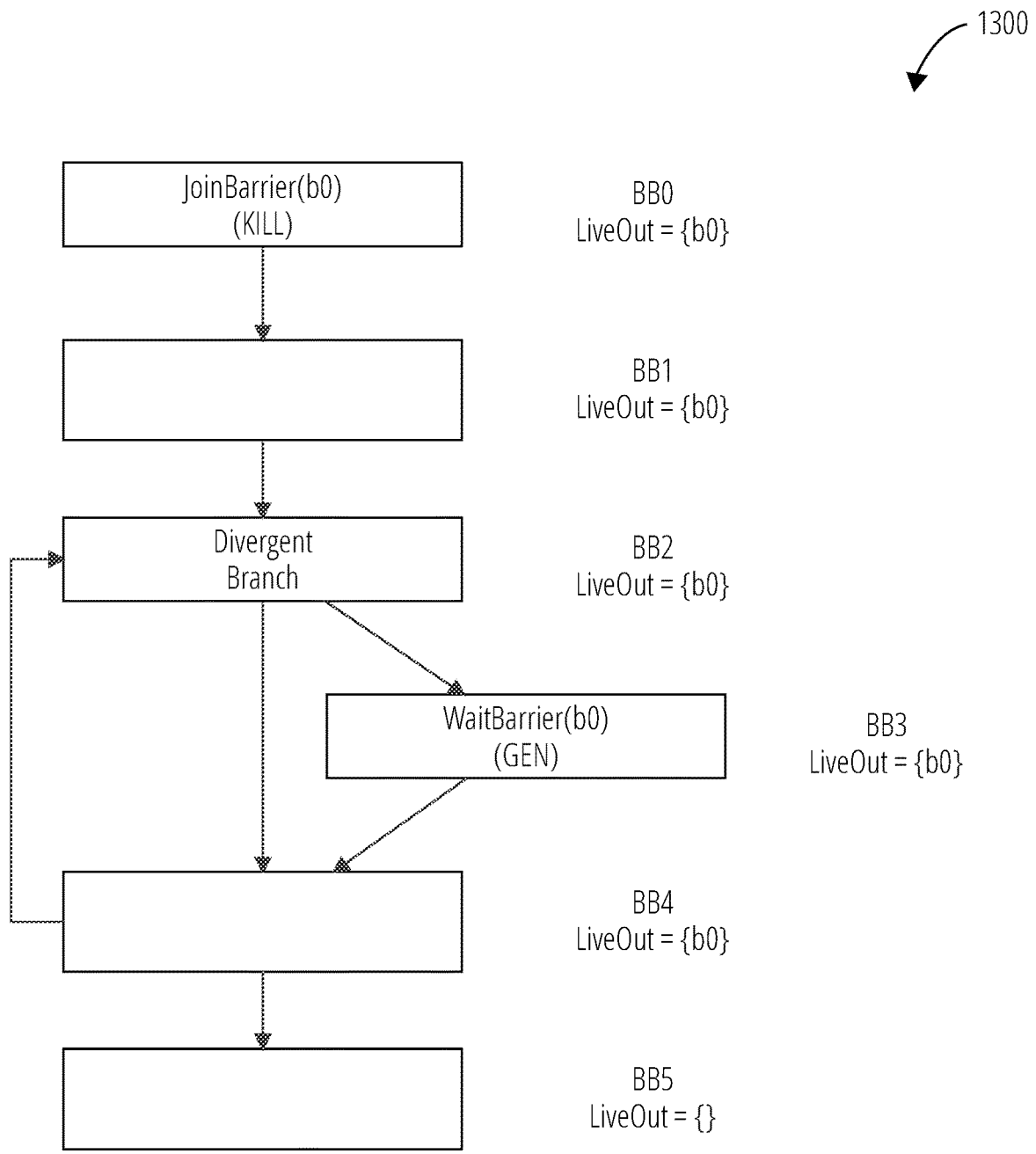
FIG. 13 illustrates an execution flow 1300 in accordance with another embodiment.
Figure 14:
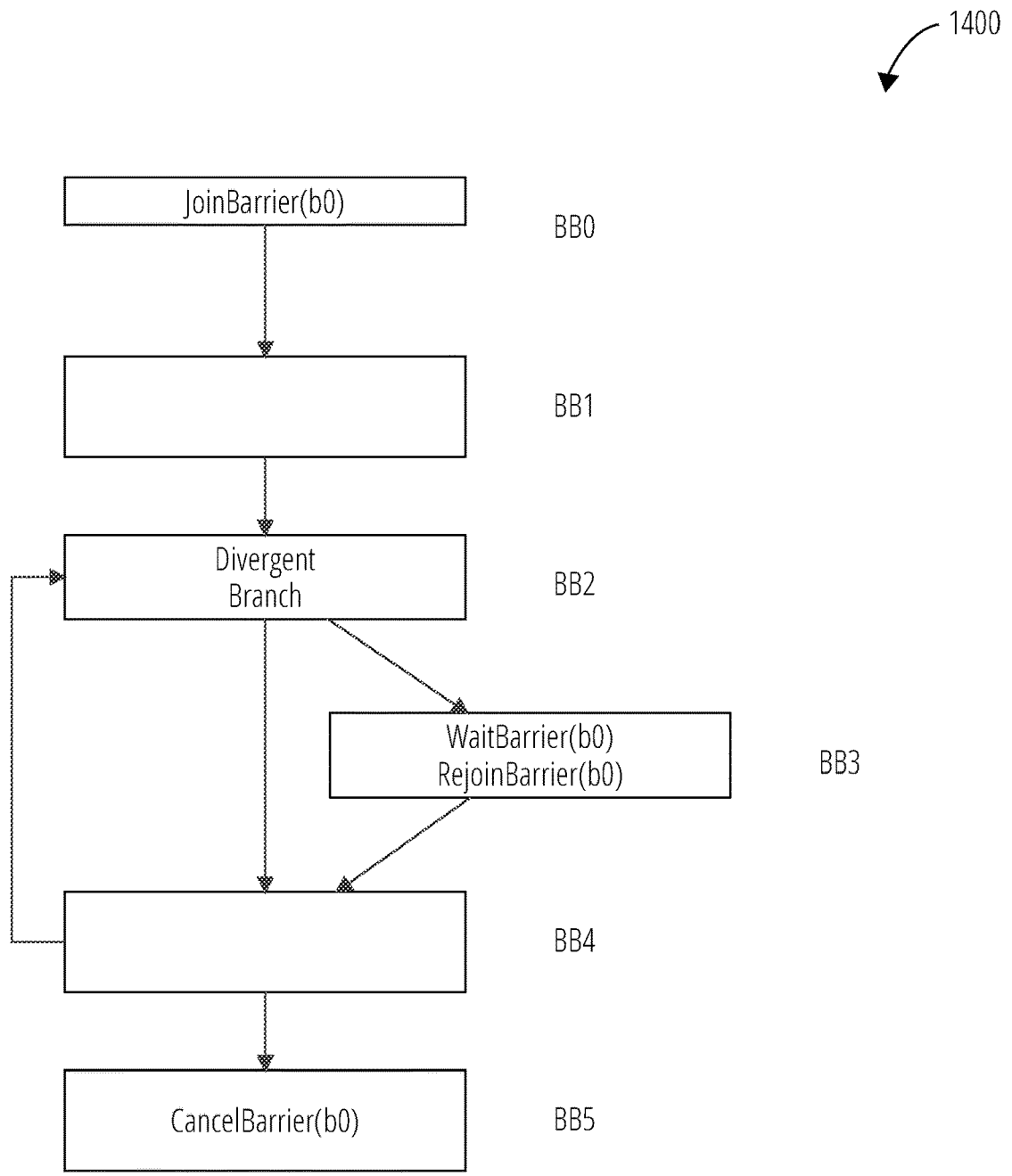
FIG. 14 illustrates an execution flow 1400 in accordance with another embodiment.

In the execution flow 1200 of FIG. 12, the barrier is dead at IN(BB5) and IN(BB0). The two data flows are combined to identify locations where (1) a thread has an uninitialized barrier use that requires insertion of a RejoinBarrier primitive (see the execution flow 1300 of FIG. 13 for insertion of a RejoinBarrier primitive in BB3 where the barrier has an uninitialized use) and (2) a barrier initialization is effectively dead for threads because there are no further uses of the barrier, where the threads must exit the barrier (see the execution flow 1400 of FIG. 14 for insertion of a CancelBarrier primitive in BB5 where threads that joined the barrier at BB0 may escape without clearing the barrier).

In addition, to ensure that all threads reconverge at the region exit, a JoinBarrier is inserted at the dominator of region entry and a WaitBarrier at the common post-dominator of all the exits out of the region. "Dominator" refers to a node (e.g., instruction) in an execution flow that all threads will necessary pass through before entering a region where thread divergence is a possibility. In FIG. 11-FIG. 14, reconvergence takes place after the CancelBarrier at block BB5. This is also depicted in FIG. 10 as barrier b1.

Two barriers are conflicting if their live ranges overlap in a non-inclusive manner, i.e. neither one is a complete subset of the other. If a region has conflicting barriers, threads may wait for each other at two different places based on compiler-inserted synchronization points and synchronization points generated using the disclosed techniques. To break this conflict and avoid unpredictable behavior, a deconfliction compiler pass is implemented.

Figure 15:
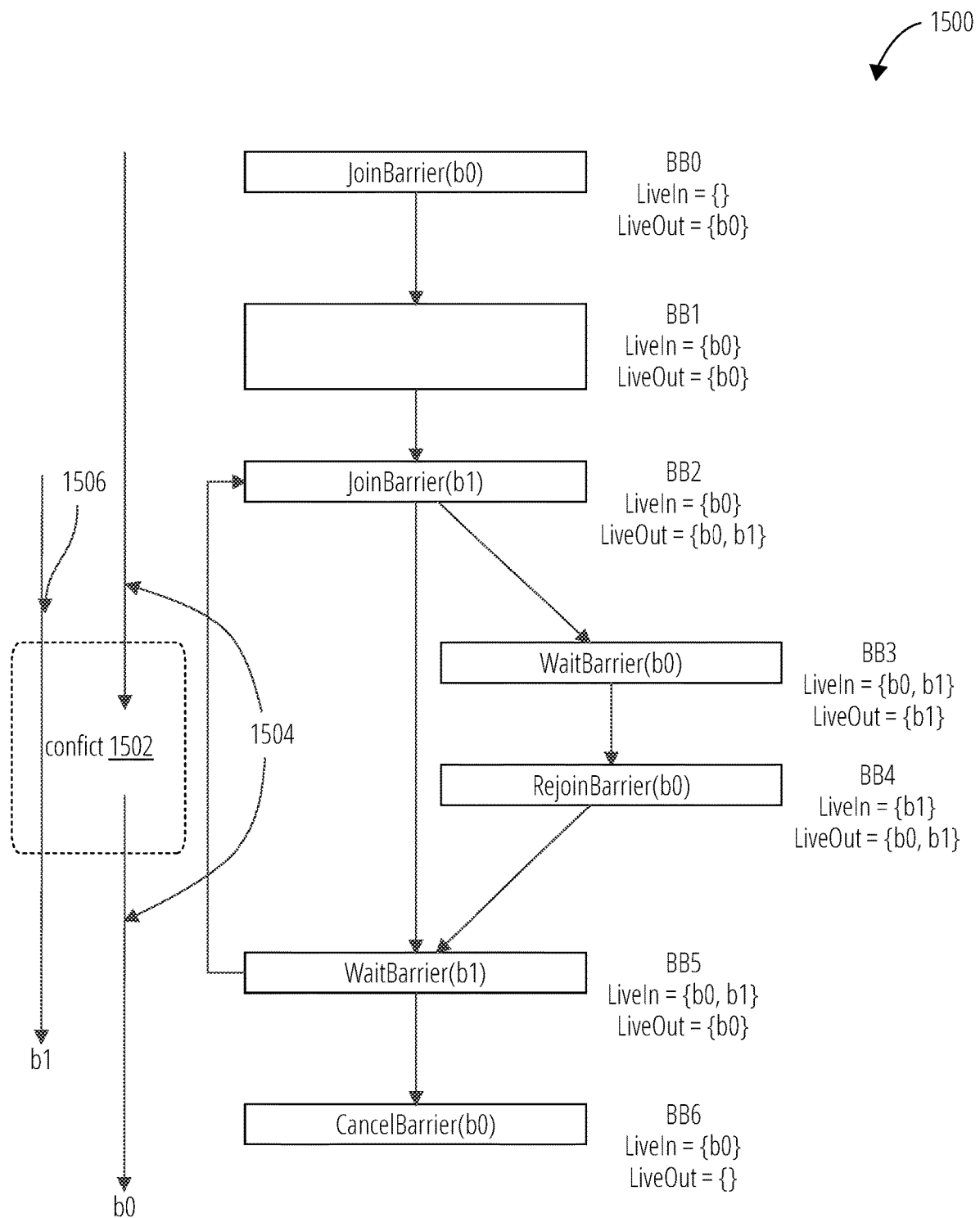
FIG. 15 illustrates an execution flow with conflict analysis 1500 in accordance with one embodiment.

A barrier live range extends from the moment threads join the barrier until the barrier is cleared (Canceled) either by waiting or exiting threads. Two barriers conflict if their respective live ranges are not independent and if neither is a subset of the other. In the execution flow with conflict analysis 1500 of FIG. 15 the live intervals 1504 for barrier b0 are inserted by the execution optimizations disclosed herein, while live interval 1506 represents the live interval for barrier b1, inserted by the compiler at the region post-dominator. Barrier b0 and b1 create a conflict 1502 because their respective live intervals overlap in a non-inclusive manner. Two deconfliction strategies are now described: static deconfliction and dynamic deconfliction.

Figure 16:
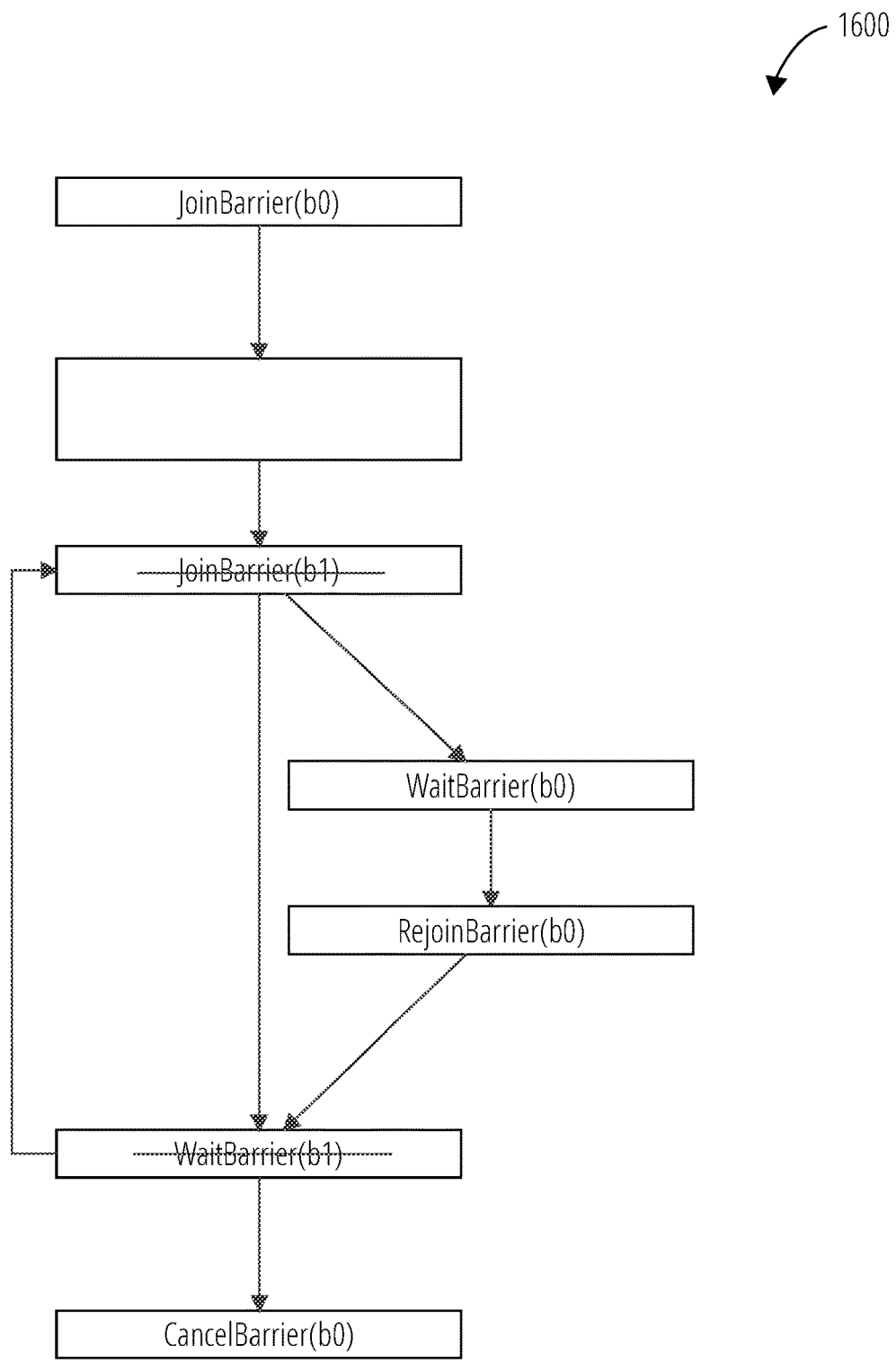
FIG. 16 illustrates a static deconfliction 1600 in accordance with one embodiment.

In static deconfliction, if two barriers are found to conflict, the compiler eliminates barrier operations corresponding to the post-dominator barrier. This removes the conflict but may result in poor performance if the newly defined convergence point is never, or rarely, entered. FIG. 16 depicts static deconfliction 1600 as applied to the example in FIG. 15. The synchronization primitives for b1 are removed thereby eliminating the conflict.

Figure 17:
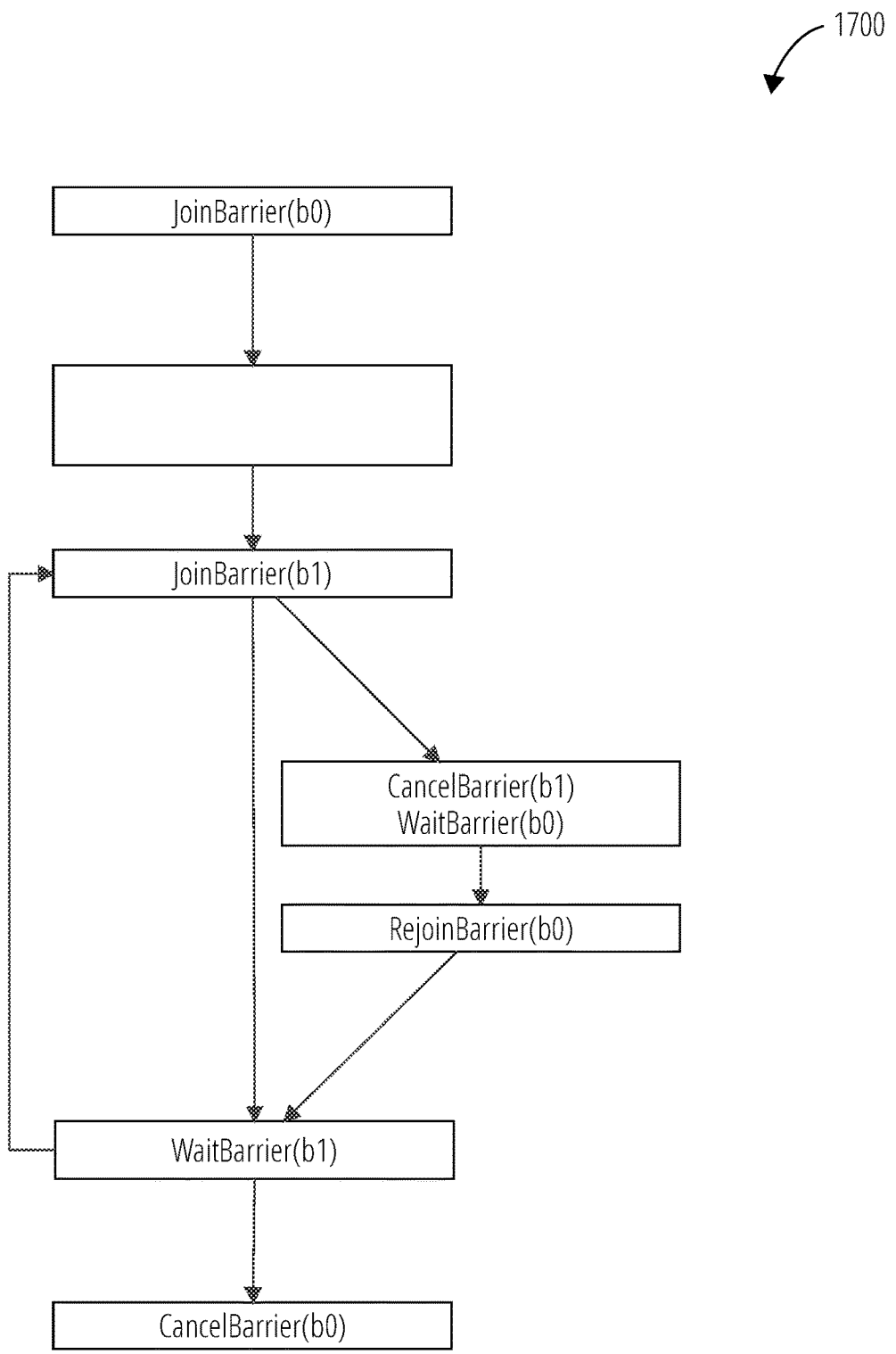
FIG. 17 illustrates a dynamic deconfliction 1700 in accordance with one embodiment.

In dynamic deconfliction, on the other hand, no instructions are deleted. Instead, threads waiting on one barrier exit out of the conflicting barrier. This helps remove conflicts but only in cases where the convergence point is in fact executed at run time. As depicted in the dynamic deconfliction 1700 of FIG. 17, threads that enter block BB3 exit barrier b1 (depicted in earlier figures) before waiting on barrier b0, thus effectively eliminating the conflict at runtime. Static deconfliction may have an advantage in terms of number of instructions executed and barrier registers used, but dynamic deconfliction does better in cases where the reconvergence point is rarely executed, such as programs with more complex control flow with multiple paths.

An extension to the disclosed execution optimizations involves an inter-procedural variant that handles a function body eventually executed by all threads in a warp (or other thread group). In the computer code section 1800 of FIG. 18, the function common( ) is ultimately called from multiple divergent branches, but is executed serially, not in parallel. To indicate the desired early reconvergence point at the entry of the function, the function name is specified instead of a label name to indicate the point (e.g., instruction) at which all threads must wait before executing in parallel. An automatic analysis to find the opportunity for converging at a common function call may detect multiple calls to the same function from blocks with the same control dependence properties within a divergent region. Another approach relies on programmer input to identify this opportunity. If the function is an extern function, the programmer or the compiler may move the function call into a wrapper function body which acts as the required reconvergence point. Multiple wrapper functions may also be used for functions that are called from within multiple independent regions of the program. To perform this optimization across functions, an inter-procedural analysis may be applied to propagate barrier information upwards through the call graph from the callee to the call site. After this first stage propagation is complete, the barrier operations are inserted by the compiler as before.

In certain code, manual modification by the programmer may be impractical. This includes code generated by parallelizing compilers, for example. In this case, automatic detection of some common code patterns may be useful. Automatic detection logic may utilize context-free grammar patterns to search for common code across loop iterations. This includes divergent branches and loops with non-warp-uniform iteration counts nested inside an outer loop. The profitability of the disclosed execution optimizations depends on the relative cost of the common code and the prolog/epilog regions of the code, which makes automatic detection of the convergence point more challenging in general. The heuristics used to compute the cost of divergence may be divided into three categories:

(1) Instruction count, which includes loop trip count and the number of high latency instructions. Due to the inaccuracy of predicting dynamic loop counts, and caching, static analysis may be too conservative. Profile information may help improve the accuracy of our profitability tests.

(2) Memory access patterns, such as convergent memory accesses may suffer if previously convergent accesses become divergent due to the disclosed optimizations. Heuristics may choose to account for the cost of making memory accesses divergent.

(3) Synchronization requirements within the program including barriers and warp synchronous instructions such as SHFL that affect the correctness of modifying the convergence properties of the region.

Figure 19:
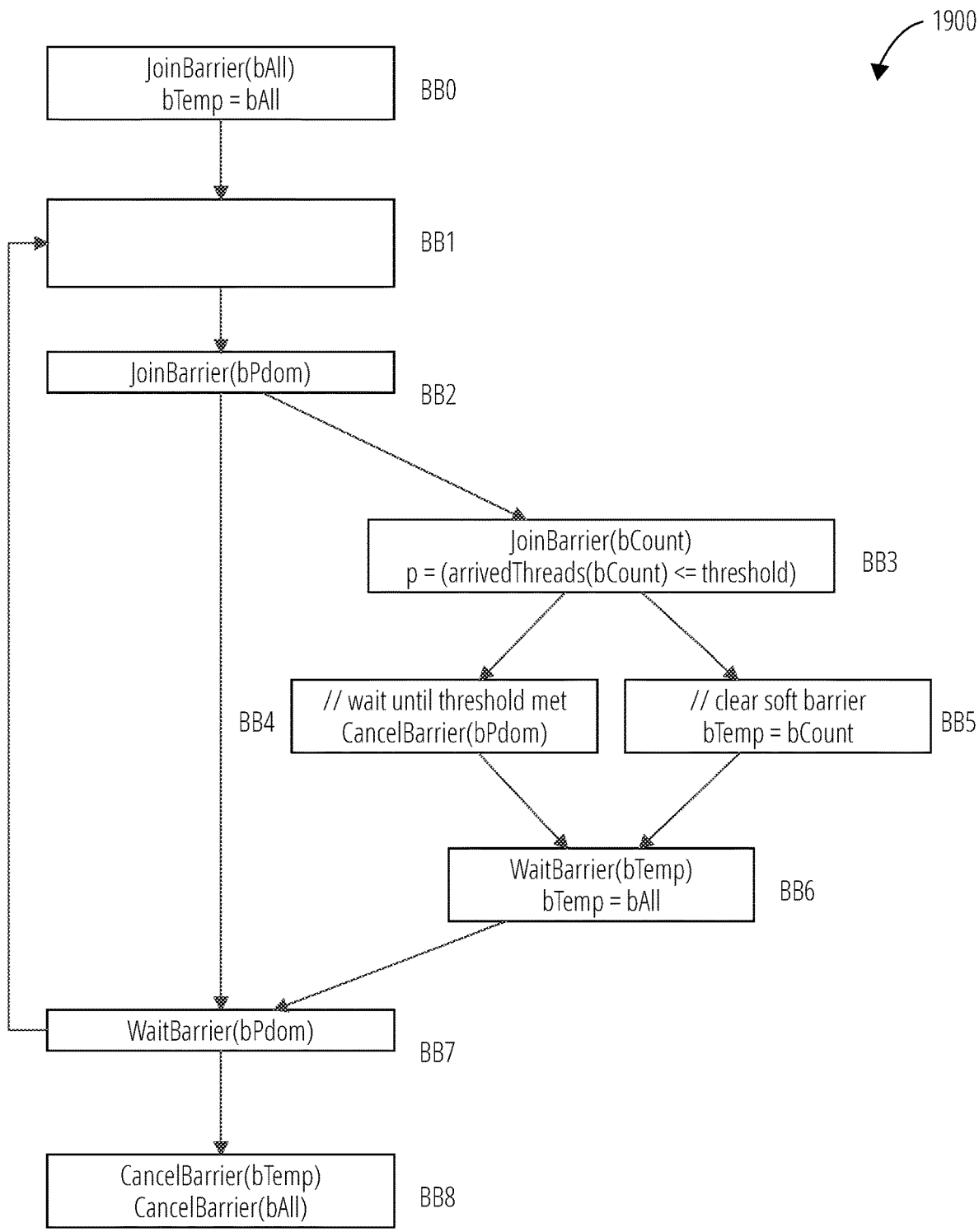
FIG. 19 illustrates an execution flow 1900 in accordance with another embodiment.

As noted previously, an optional threshold parameter may be specified to ensure that at least some minimum set of threads arrive at the reconvergence point, allowing threads to proceed without having to wait for all possible participants so that multiple expensive points within the region may be executed in a partially convergent manner. The goal of soft barriers is to ensure that the cost of divergence is amortized across the various expensive code sections within the region. FIG. 19 depicts a detailed view of an execution flow 1900 loop merge with soft barriers. A barrier count bCount counts all threads that arrive at the user-defined convergence point, and variable bTemp ensures they all proceed convergently once the threshold has been met, i.e. sufficient threads have arrived. bPdom (for post-dominator) is the compiler defined convergence point used to collect threads before executing the loop tail. If the threshold isn't met at the user-defined divergence point, threads waiting must exit bPdom to allow the remaining threads to execute the loop. This is a form of dynamic barrier deconfliction for soft barriers and is implemented similarly.

Compute unified device architecture (CUDA) is a parallel computing platform and application programming interface (API) model for Nvidia® graphics processing units. CUDA enables software developers to use a CUDA-enabled graphics processing unit (GPU) for general purpose processing—an approach termed GPGPU (General-Purpose computing on Graphics Processing Units). CUDA provides a software layer for direct access to the GPU's virtual instruction set and parallel computational elements to execute compute kernels. Compute kernels are built up from execution threads, which are the most primitive code blocks that can be independently executed.

In the CUDA environment, threads are grouped into warps (e.g., 32 threads). Several warps constitute a thread block. Each thread block is assigned for execution by a streaming multiprocessor (SM), with each thread assigned to a different execution core of the SM, and the threads then execute concurrently within the SM. A thread scheduler (more generally, an execution scheduler) controls the execution priority of warps in a thread block, based on configured scheduling policies.

Each SM comprises a programmable streaming processor that is configured to process tasks represented by a number of threads. "Process" refers to software that is in the process of being executed on a device. Each SM is multi-threaded and configured to execute a plurality of threads (e.g., 32 threads of a warp) concurrently. The SM may utilize a single-instruction, multiple thread (SIMT) architecture where each thread in a group of threads is configured to process a different set of data using a common code section, but where individual threads in the group of threads are allowed to diverge during execution. In other words, when an instruction for the group of threads is dispatched for execution, some threads in the group of threads may be active, therefor executing the instruction, while other threads in the group of threads may be inactive, therefor not executing the instruction. The latter situation is known as thread divergence and causes execution of the warp to lose efficiency.

Figure 20:
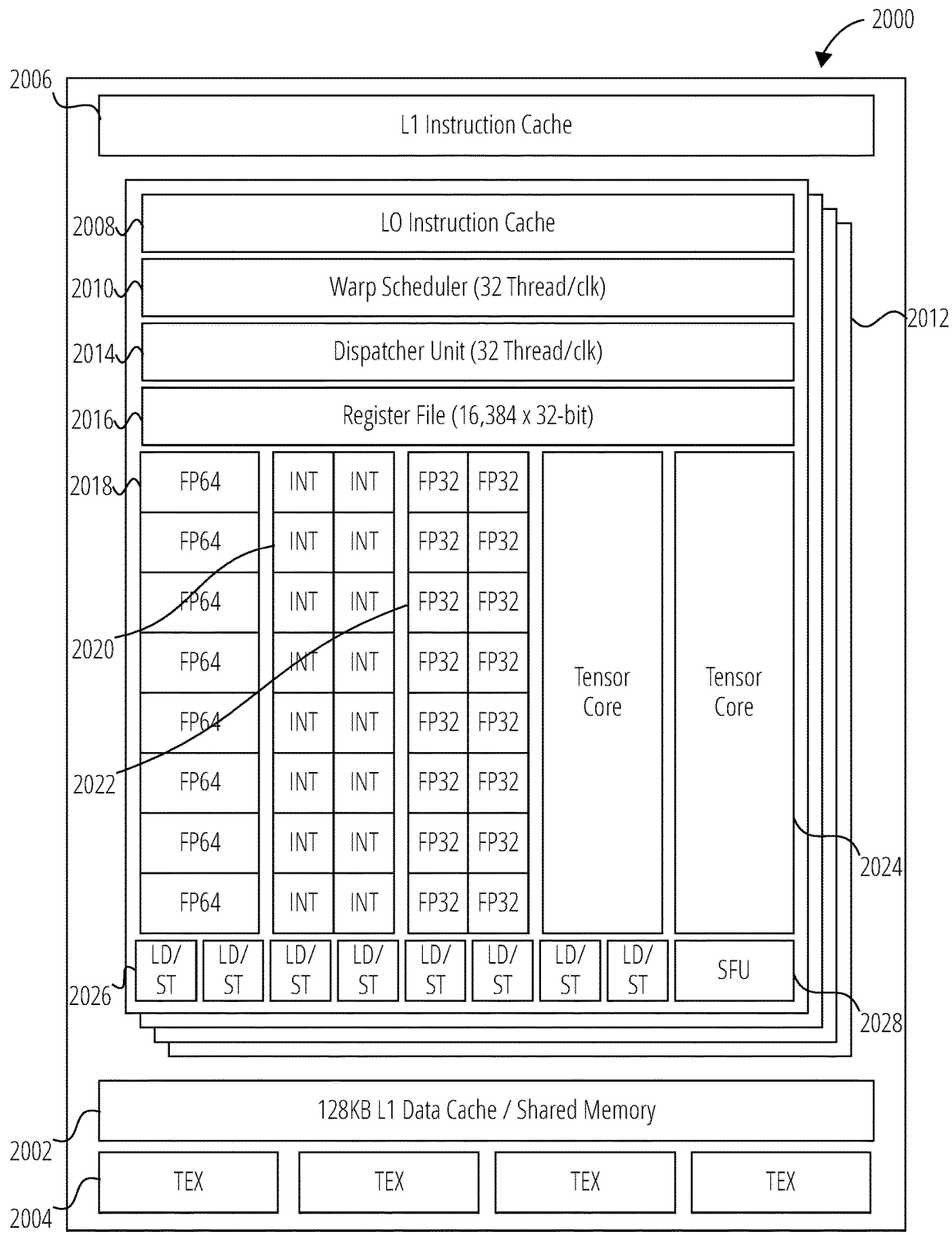
FIG. 20 depicts streaming multiprocessors 2000 in accordance with one embodiment.

Referencing FIG. 20, streaming multiprocessors 2000 are illustrated in one embodiment. The streaming multiprocessors 2000 may be implement aspects of improved thread convergence in accordance with the methods disclosed herein. For example the streaming multiprocessors 2000 may provide aspects of the thread scheduler and code profiler described herein, as well as hardware to provide execution of the disclosed instructions (Predict instruction, Join instruction, Rejoin instruction, Cancel instruction, and Wait instruction).

The illustrated streaming multiprocessors 2000 are representative of a Volta® Streaming Multiprocessor (SM) architecture that delivers improvements in performance, energy efficiency, and ease of programmability over older designs. The major features of the streaming multiprocessors 2000 include two mixed-precision tensor cores 2024 purpose-built for deep learning matrix arithmetic, delivering 12×TFLOPS for training compared to the GP100, in the same power envelope, and 50% higher energy efficiency on general compute workloads.

The streaming multiprocessors 2000 utilize a high performance LI data cache and a SIMT thread model that removes limitations present in previous SIMT and SIMD processor designs. The GV100 includes an L1 instruction cache 2006, a 128 KB L1 data cache/shared memory 2002 and four TEX blocks 2004. The GV100 SM is partitioned into four processing blocks 2012, each with sixteen FP32 cores 2022, eight FP64 cores 2018, sixteen INT 32 cores 2020, the two mixed-precision tensor cores 2024 for deep learning matrix arithmetic, a LO instruction cache 2008, one warp scheduler 2010, one dispatch dispatcher unit 2014, and a 64 KB register file 2016. The LO instruction cache 2008 is used in each partition to provide higher efficiency than the instruction buffers used in prior nVIDIA GPUs. Additionally, each of the processing blocks 2012 includes eight LD/ST blocks 2026 and a special function unit block (SFU 2028).

While a GV100 SM has the same number of registers as a Pascal GP100 SM, the entire GV100 GPU has far more SMs, and thus many more registers overall. In aggregate, GV100 supports more threads, warps, and thread blocks in flight compared to prior GPU generations.

The merger of shared memory and L1 resources enables an increase in shared memory capacity to 96 KB per Volta SM, compared to 64 KB in GP100.

Tesla P100 delivered considerably higher performance for training neural networks compared to the prior generation nVIDIA Maxwell and Kepler architectures, but the complexity and size of neural networks have continued to grow. As mentioned, new networks with thousands of layers and millions of neurons demand even higher performance and faster training times.

New tensor cores are a key capability enabling the Volta GV100 GPU architecture to deliver the performance required to train large neural networks.

The Tesla V100 GPU contains 640 tensor cores: eight per SM and two per processing block (partition) within an SM. In Volta GV100, each tensor core performs 64 floating point FMA operations per clock, and eight tensor cores in an SM perform a total of 512 FMA operations (or 1,024 individual floating point operations) per clock.

Tesla V100's tensor cores deliver up to 125 tensor TFLOPS for training and inference applications. Tensor cores provide up to 12× higher peak TFLOPS on Tesla V100 that can be applied to deep learning training compared to using standard FP32 operations on P100. For deep learning inference, V100 tensor cores provide up to 6× higher peak TFLOPS compared to standard FP16 operations on P100.

Matrix-matrix multiplication (GEMM) operations are at the core of neural network training and inferencing, and are used to multiply large matrices of input data and weights in the connected layers of the network.

Figure 21:
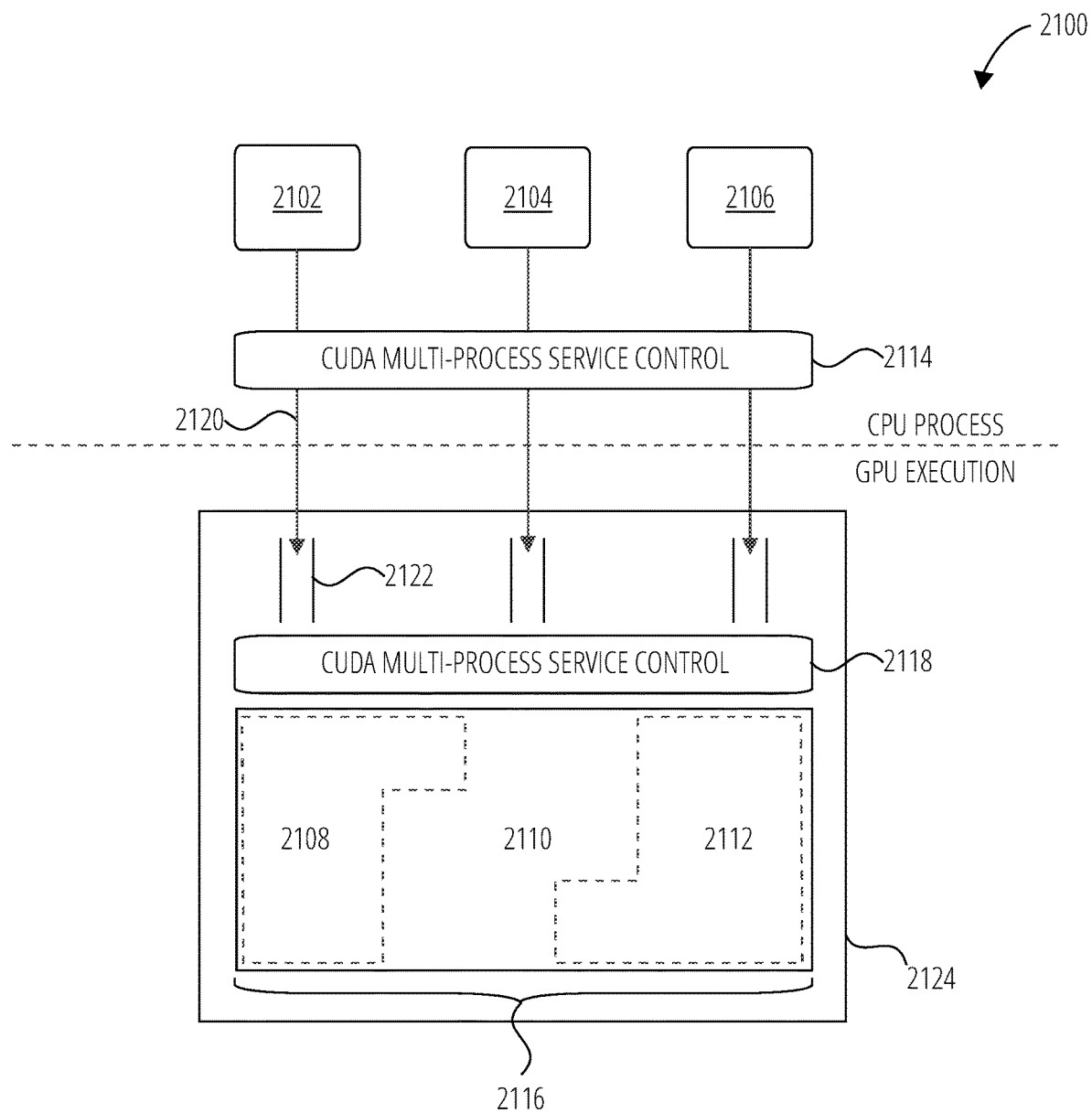
FIG. 21 depicts a multi-process service environment 2100 in accordance with one embodiment.

Referencing FIG. 21, a multi-process service environment 2100 using Volta Multi-Process Service (MPS 2118) is a feature of the Volta GV100 architecture enabling improved performance and isolation for multiple compute applications sharing the GPU. The MPS 2118 may be used to implement improved thread convergence in accordance with the methods disclosed herein. Typical execution of multiple applications sharing the GPU is implemented with time-slicing, that is, each application gets exclusive access for a period of time before access is granted to another application. Volta MPS improves aggregate GPU utilization by allowing multiple applications to simultaneously share GPU execution resources when these applications individually under-utilize the GPU execution resources. Starting with Kepler GK110 GPUs, NVIDIA introduced a software-based multi-process service (MPS) and MPS server that allowed multiple different CPU processes (application contexts) to be combined into a single application context and run on the GPU, attaining higher GPU resource utilization. Volta MPS 2118 provides hardware acceleration of critical components of the MPS server for improved performance and isolation, while increasing the maximum number of MPS clients from 16 on Pascal up to 48 on Volta. Volta Multi-Process service is designed for sharing the GPU amongst applications from a single user and is not for multi-user or multi-tenant use cases. For Pascal, CUDA multi-process service controller 2114 is a CPU process which acts on behalf of GPU applications that have requested to simultaneously share execution resources 2116 with other GPU applications. This process acts as the intermediary to submit work 2120 to the work queues 2122 inside the GPU 2124 for concurrent kernel execution. The Volta multi-process service provides hardware acceleration of CUDA MPS, which enables MPS clients to submit work directly to the work queues 2122 within the GPU 2124. This acceleration significantly decreases submission latency and increases aggregate throughput. For Volta, the CPU MPS control process remains for configuration and opt-in to the MPS. Volta MPS improves isolation amongst MPS clients on two critical metrics: Quality of Service (QoS) and independent address spaces. In Volta, the work from different MPS clients (multi-process service client 2102, multi-process service client 2104, and multi-process service client 2106) get address isolation, in addition to QoS. Volta MPS, as with CUDA MPS on prior NVIDIA GPUs, does not provide fatal fault isolation between clients.

Quality of Service is how quickly the GPU execution resources will be available to process work for a client upon submission of the work. Volta MPS provides control for MPS clients to specify what fraction of the GPU (GPU fraction 2108, GPU fraction 2110, and GPU fraction 2112) is necessary for execution. This control to restrict each client to only a fraction of the GPU execution resources reduces or eliminates head-of-line blocking where work from one MPS client may overwhelm GPU execution resources, preventing other clients from making progress until prior work from another MPS client completes. This QoS improvement reduces average latency and jitter in a system, which is critical for both MPI/HPC use cases as well as for deep learning inference use cases. Volta provides very high throughput and low latency for deep learning inference particular when there is a batching system in place to aggregate images to submit to the GPU simultaneously to maximize performance. Without such a batching system, individual inference jobs do not fully utilize execution resources of a GPU. Volta MPS provides an easy option to improve throughput while satisfying latency targets, by permitting many individual inference jobs to be submitted concurrently to the GPU and improving overall GPU utilization.

The algorithms and techniques disclosed herein may be executed by computing devices utilizing one or more graphic processing unit and/or general purpose data processor (e.g., a 'central processing unit or CPU). Exemplary machine architectures will now be described that may be configured to carry out the techniques disclosed herein.

Parallel Processing Unit

Figure 22:
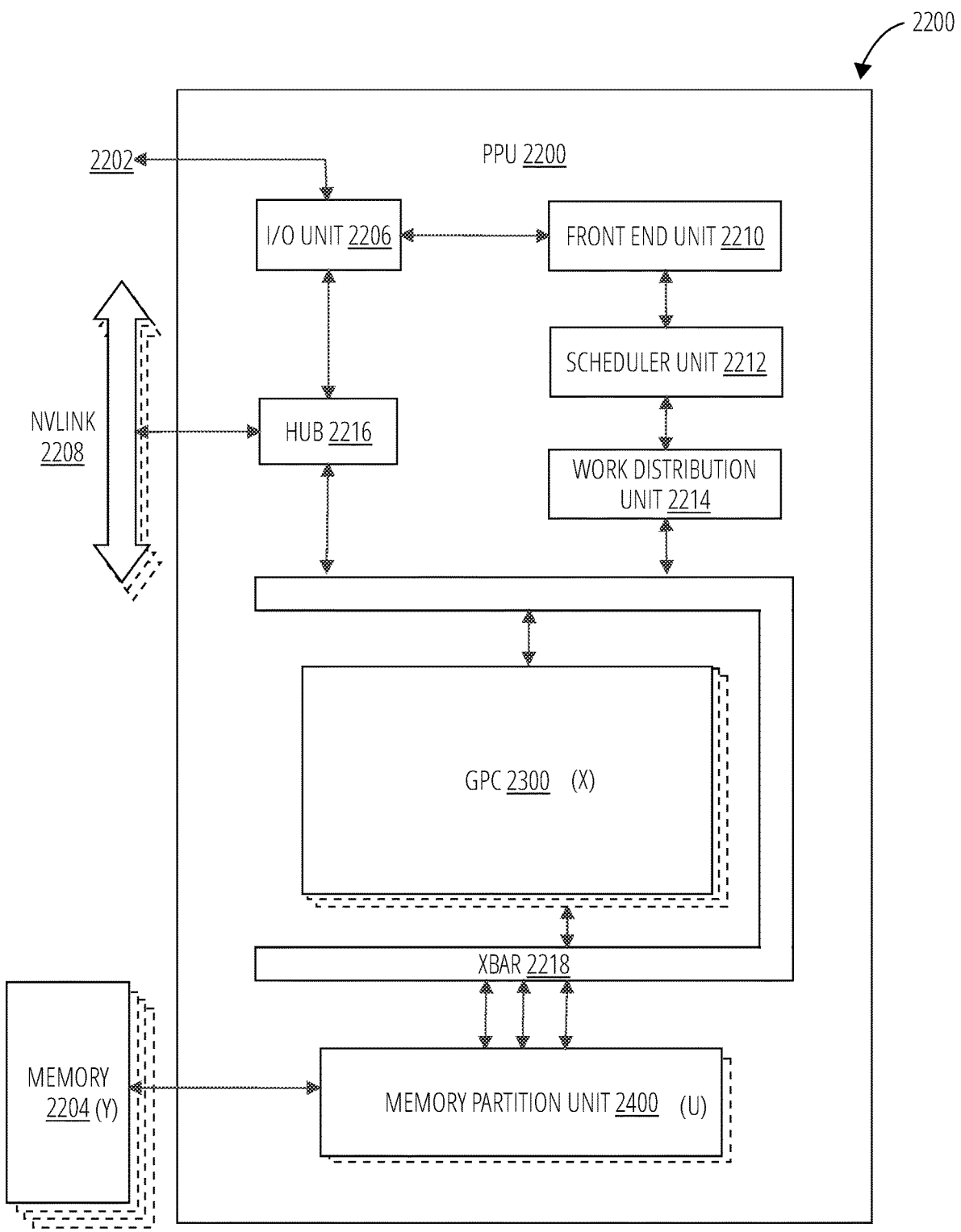
FIG. 22 illustrates a parallel processing unit 2200 in accordance with one embodiment.

FIG. 22 illustrates a parallel processing unit 2200, in accordance with an embodiment. In an embodiment, the parallel processing unit 2200 is a multi-threaded processor that is implemented on one or more integrated circuit devices. The parallel processing unit 2200 is a latency hiding architecture designed to process many threads in parallel. A thread (e.g., a thread of execution) is an instantiation of a set of instructions configured to be executed by the parallel processing unit 2200. In an embodiment, the parallel processing unit 2200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 2200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 2200 modules may be configured to accelerate thousands of High Performance Computing (HPC), data center, and machine learning applications. The parallel processing unit 2200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 22, the parallel processing unit 2200 includes an I/O unit 2206, a front end unit 2210, a scheduler unit 2212, a work distribution unit 2214, a hub 2216, a crossbar 2218, one or more GPC 2300 modules, and one or more memory partition unit 2400 modules. The parallel processing unit 2200 may be connected to a host processor or other parallel processing unit 2200 modules via one or more high-speed NVLink 2208 interconnects. The parallel processing unit 2200 may be connected to a host processor or other peripheral devices via an interconnect 2202. The parallel processing unit 2200 may also be connected to a local memory comprising a number of memory 2204 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 2204 may comprise logic to configure the parallel processing unit 2200 to carry out aspects of the techniques disclosed herein.

The NVLink 2208 interconnect enables systems to scale and include one or more parallel processing unit 2200 modules combined with one or more CPUs, supports cache coherence between the parallel processing unit 2200 modules and CPUs, and CPU mastering. Data and/or commands may be transmitted by the NVLink 2208 through the hub 2216 to/from other units of the parallel processing unit 2200 such as one or more copy engines, a video encoder, a video decoder, a power management unit, etc. (not explicitly shown). The NVLink 2208 is described in more detail in conjunction with FIG. 26.

The I/O unit 2206 is configured to transmit and receive communications (e.g., commands, data, etc.) from a host processor (not shown) over the interconnect 2202. The I/O unit 2206 may communicate with the host processor directly via the interconnect 2202 or through one or more intermediate devices such as a memory bridge. In an embodiment, the I/O unit 2206 may communicate with one or more other processors, such as one or more parallel processing unit 2200 modules via the interconnect 2202. In an embodiment, the I/O unit 2206 implements a Peripheral Component Interconnect Express (PCIe) interface for communications over a PCIe bus and the interconnect 2202 is a PCIe bus. In alternative embodiments, the I/O unit 2206 may implement other types of well-known interfaces for communicating with external devices.

The I/O unit 2206 decodes packets received via the interconnect 2202. In an embodiment, the packets represent commands configured to cause the parallel processing unit 2200 to perform various operations. The I/O unit 2206 transmits the decoded commands to various other units of the parallel processing unit 2200 as the commands may specify. For example, some commands may be transmitted to the front end unit 2210. Other commands may be transmitted to the hub 2216 or other units of the parallel processing unit 2200 such as one or more copy engines, a video encoder, a video decoder, a power management unit, etc. (not explicitly shown). In other words, the I/O unit 2206 is configured to route communications between and among the various logical units of the parallel processing unit 2200.

In an embodiment, a program executed by the host processor encodes a command stream in a buffer that provides workloads to the parallel processing unit 2200 for processing. A workload may comprise several instructions and data to be processed by those instructions. The buffer is a region in a memory that is accessible (e.g., read/write) by both the host processor and the parallel processing unit 2200. For example, the I/O unit 2206 may be configured to access the buffer in a system memory connected to the interconnect 2202 via memory requests transmitted over the interconnect 2202. In an embodiment, the host processor writes the command stream to the buffer and then transmits a pointer to the start of the command stream to the parallel processing unit 2200. The front end unit 2210 receives pointers to one or more command streams. The front end unit 2210 manages the one or more streams, reading commands from the streams and forwarding commands to the various units of the parallel processing unit 2200.

The front end unit 2210 is coupled to a scheduler unit 2212 that configures the various GPC 2300 modules to process tasks defined by the one or more streams. The scheduler unit 2212 is configured to track state information related to the various tasks managed by the scheduler unit 2212. The state may indicate which GPC 2300 a task is assigned to, whether the task is active or inactive, a priority level associated with the task, and so forth. The scheduler unit 2212 manages the execution of a plurality of tasks on the one or more GPC 2300 modules.

The scheduler unit 2212 is coupled to a work distribution unit 2214 that is configured to dispatch tasks for execution on the GPC 2300 modules. The work distribution unit 2214 may track a number of scheduled tasks received from the scheduler unit 2212. In an embodiment, the work distribution unit 2214 manages a pending task pool and an active task pool for each of the GPC 2300 modules. The pending task pool may comprise a number of slots (e.g., 32 slots) that contain tasks assigned to be processed by a particular GPC 2300. The active task pool may comprise a number of slots (e.g., 4 slots) for tasks that are actively being processed by the GPC 2300 modules. As a GPC 2300 finishes the execution of a task, that task is evicted from the active task pool for the GPC 2300 and one of the other tasks from the pending task pool is selected and scheduled for execution on the GPC 2300. If an active task has been idle on the GPC 2300, such as while waiting for a data dependency to be resolved, then the active task may be evicted from the GPC 2300 and returned to the pending task pool while another task in the pending task pool is selected and scheduled for execution on the GPC 2300.

The work distribution unit 2214 communicates with the one or more GPC 2300 modules via crossbar 2218. The crossbar 2218 is an interconnect network that couples many of the units of the parallel processing unit 2200 to other units of the parallel processing unit 2200. For example, the crossbar 2218 may be configured to couple the work distribution unit 2214 to a particular GPC 2300. Although not shown explicitly, one or more other units of the parallel processing unit 2200 may also be connected to the crossbar 2218 via the hub 2216.

The tasks are managed by the scheduler unit 2212 and dispatched to a GPC 2300 by the work distribution unit 2214. The GPC 2300 is configured to process the task and generate results. The results may be consumed by other tasks within the GPC 2300, routed to a different GPC 2300 via the crossbar 2218, or stored in the memory 2204. The results can be written to the memory 2204 via the memory partition unit 2400 modules, which implement a memory interface for reading and writing data to/from the memory 2204. The results can be transmitted to another parallel processing unit 2200 or CPU via the NVLink 2208. In an embodiment, the parallel processing unit 2200 includes a number U of memory partition unit 2400 modules that is equal to the number of separate and distinct memory 2204 devices coupled to the parallel processing unit 2200. A memory partition unit 2400 will be described in more detail below in conjunction with FIG. 24.

In an embodiment, a host processor executes a driver kernel that implements an application programming interface (API) that enables one or more applications executing on the host processor to schedule operations for execution on the parallel processing unit 2200. In an embodiment, multiple compute applications are simultaneously executed by the parallel processing unit 2200 and the parallel processing unit 2200 provides isolation, quality of service (QoS), and independent address spaces for the multiple compute applications. An application may generate instructions (e.g., API calls) that cause the driver kernel to generate one or more tasks for execution by the parallel processing unit 2200. The driver kernel outputs tasks to one or more streams being processed by the parallel processing unit 2200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 25.

Figure 23:
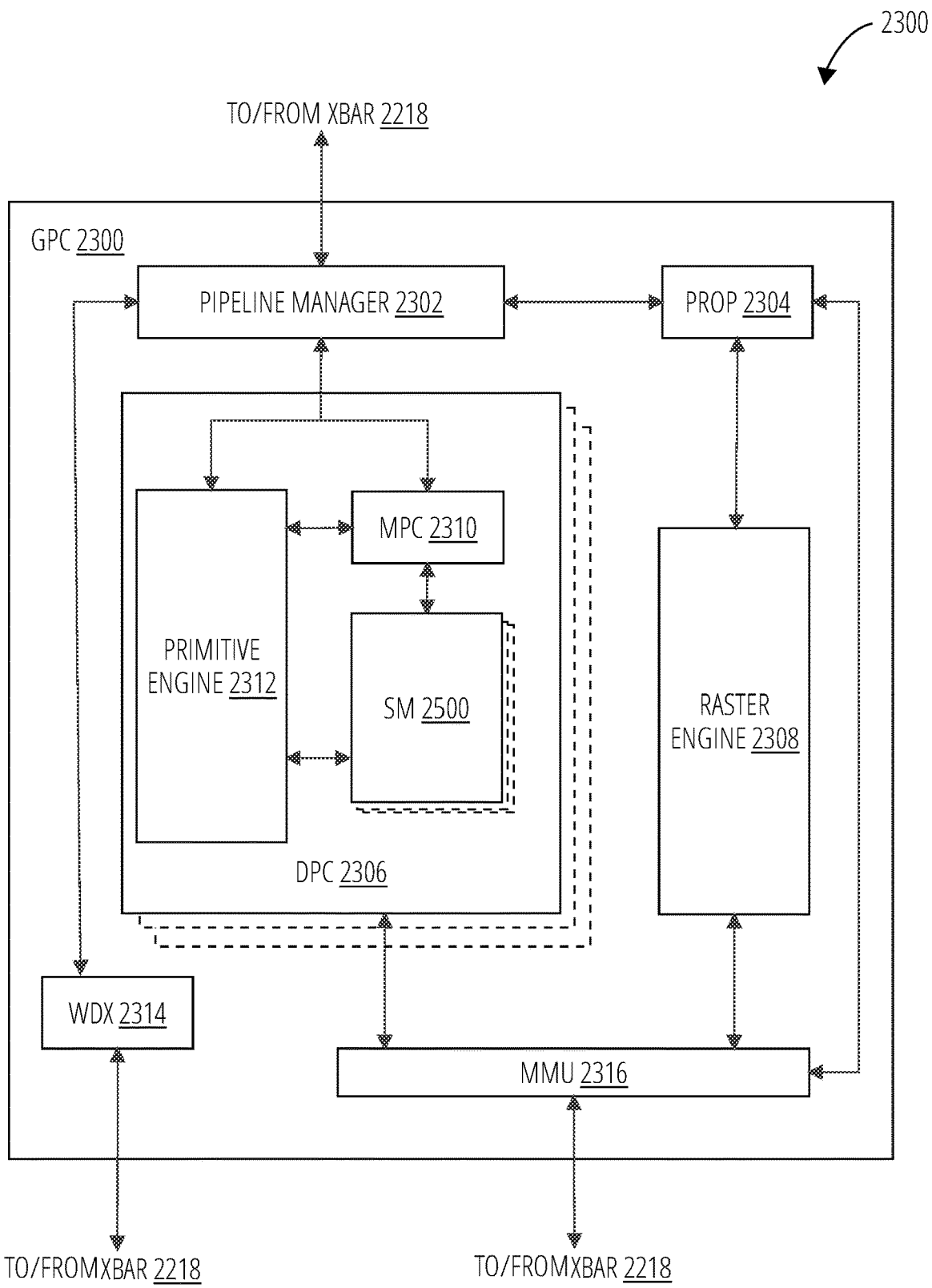
FIG. 23 illustrates a GPC 2300 in accordance with one embodiment.

FIG. 23 illustrates a GPC 2300 of the parallel processing unit 2200 of FIG. 22, in accordance with an embodiment. As shown in FIG. 23, each GPC 2300 includes a number of hardware units for processing tasks. In an embodiment, each GPC 2300 includes a pipeline manager 2302, a PROP 2304, a raster engine 2308, a WDX 2314, an MMU 2316, and one or more DPC 2306. It will be appreciated that the GPC 2300 of FIG. 23 may include other hardware units in lieu of or in addition to the units shown in FIG. 23.

In an embodiment, the operation of the GPC 2300 is controlled by the pipeline manager 2302. The pipeline manager 2302 manages the configuration of the one or more DPC 2306 modules for processing tasks allocated to the GPC 2300. In an embodiment, the pipeline manager 2302 may configure at least one of the one or more DPC 2306 modules to implement at least a portion of a graphics rendering pipeline. For example, a DPC 2306 may be configured to execute a vertex shader program on the programmable SM 2500. The pipeline manager 2302 may also be configured to route packets received from the work distribution unit 2214 to the appropriate logical units within the GPC 2300. For example, some packets may be routed to fixed function hardware units in the PROP 2304 and/or raster engine 2308 while other packets may be routed to the DPC 2306 modules for processing by the primitive engine 2312 or the SM 2500. In an embodiment, the pipeline manager 2302 may configure at least one of the one or more DPC 2306 modules to implement a neural network model and/or a computing pipeline.

Figure 24:
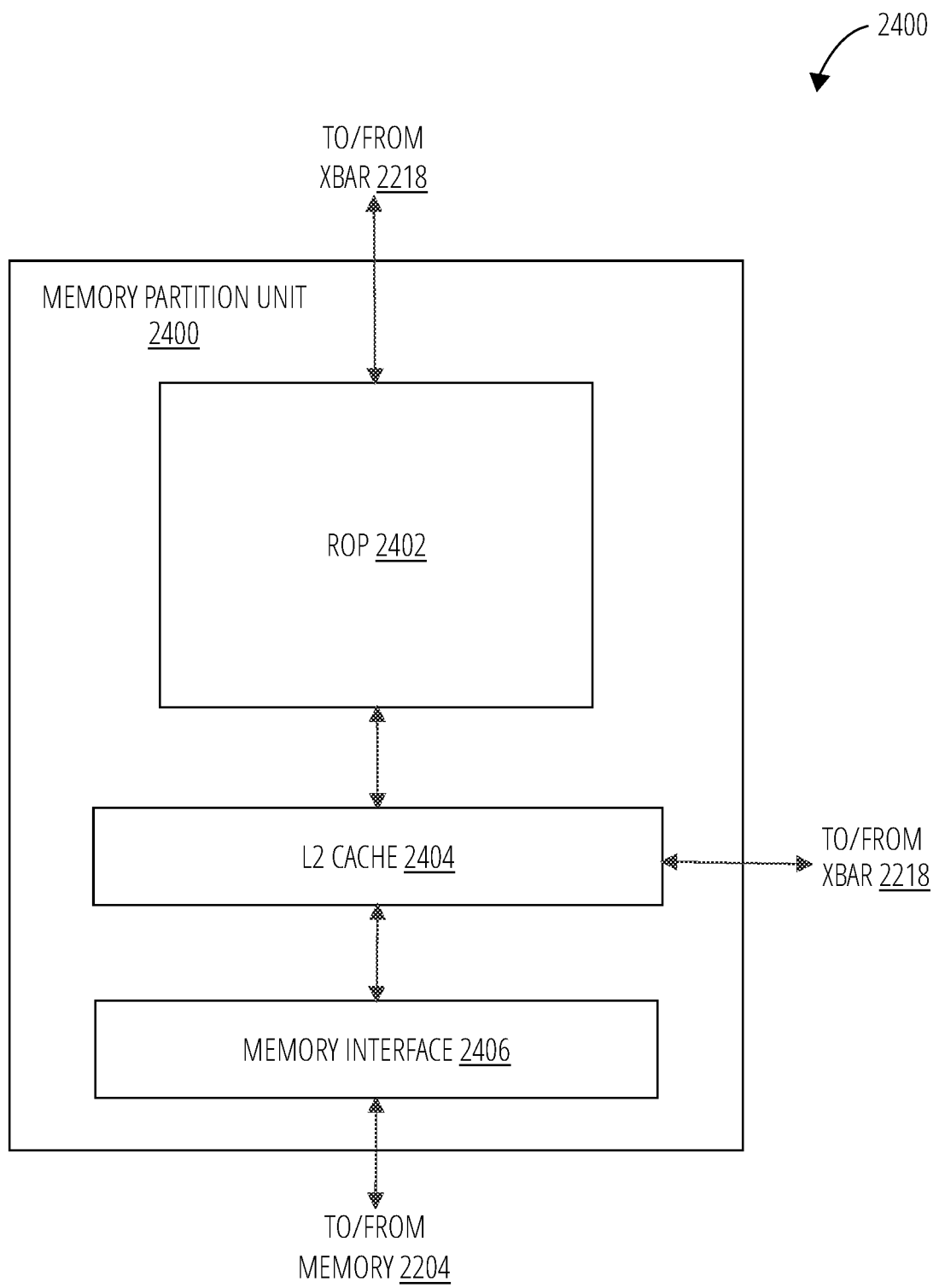
FIG. 24 illustrates a memory partition unit 2400 in accordance with one embodiment.

The PROP 2304 is configured to route data generated by the raster engine 2308 and the DPC 2306 modules to a Raster Operations (ROP) unit, described in more detail in conjunction with FIG. 24. The PROP 2304 may also be configured to perform optimizations for color blending, organize pixel data, perform address translations, and the like.

The raster engine 2308 includes a number of fixed function hardware units configured to perform various raster operations. In an embodiment, the raster engine 2308 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 2308 comprises fragments to be processed, for example, by a fragment shader implemented within a DPC 2306.

Each DPC 2306 included in the GPC 2300 includes an MPC 2310, a primitive engine 2312, and one or more SM 2500 modules. The MPC 2310 controls the operation of the DPC 2306, routing packets received from the pipeline manager 2302 to the appropriate units in the DPC 2306. For example, packets associated with a vertex may be routed to the primitive engine 2312, which is configured to fetch vertex attributes associated with the vertex from the memory 2204. In contrast, packets associated with a shader program may be transmitted to the SM 2500.

The SM 2500 comprises a programmable streaming processor that is configured to process tasks represented by a number of threads. Each SM 2500 is multi-threaded and configured to execute a plurality of threads (e.g., 32 threads) from a particular group of threads concurrently. In an embodiment, the SM 2500 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the SM 2500 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 2500 will be described in more detail below in conjunction with FIG. 25.

The MMU 2316 provides an interface between the GPC 2300 and the memory partition unit 2400. The MMU 2316 may provide translation of virtual addresses into physical addresses, memory protection, and arbitration of memory requests. In an embodiment, the MMU 2316 provides one or more translation lookaside buffers (TLBs) for performing translation of virtual addresses into physical addresses in the memory 2204.

FIG. 24 illustrates a memory partition unit 2400 of the parallel processing unit 2200 of FIG. 22, in accordance with an embodiment. As shown in FIG. 24, the memory partition unit 2400 includes a ROP 2402, an L2 cache 2404, and a memory interface 2406. The memory interface 2406 is coupled to the memory 2204. Memory interface 2406 may implement 32, 64, 128, 1024-bit data buses, or the like, for high-speed data transfer. In an embodiment, the parallel processing unit 2200 incorporates U memory interface 2406 modules, one memory interface 2406 per pair of memory partition unit 2400 modules, where each pair of memory partition unit 2400 modules is connected to a corresponding memory 2204 device. For example, parallel processing unit 2200 may be connected to up to Y memory 2204 devices, such as high bandwidth memory stacks or graphics double-data-rate, version 5, synchronous dynamic random access memory, or other types of persistent storage.

In an embodiment, the memory interface 2406 implements an HBM2 memory interface and Y equals half U. In an embodiment, the HBM2 memory stacks are located on the same physical package as the parallel processing unit 2200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 2204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 2200 modules process very large datasets and/or run applications for extended periods.

In an embodiment, the parallel processing unit 2200 implements a multi-level memory hierarchy. In an embodiment, the memory partition unit 2400 supports a unified memory to provide a single unified virtual address space for CPU and parallel processing unit 2200 memory, enabling data sharing between virtual memory systems. In an embodiment the frequency of accesses by a parallel processing unit 2200 to memory located on other processors is traced to ensure that memory pages are moved to the physical memory of the parallel processing unit 2200 that is accessing the pages more frequently. In an embodiment, the NVLink 2208 supports address translation services allowing the parallel processing unit 2200 to directly access a CPU's page tables and providing full access to CPU memory by the parallel processing unit 2200.

In an embodiment, copy engines transfer data between multiple parallel processing unit 2200 modules or between parallel processing unit 2200 modules and CPUs. The copy engines can generate page faults for addresses that are not mapped into the page tables. The memory partition unit 2400 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 2204 or other system memory may be fetched by the memory partition unit 2400 and stored in the L2 cache 2404, which is located on-chip and is shared between the various GPC 2300 modules. As shown, each memory partition unit 2400 includes a portion of the L2 cache 2404 associated with a corresponding memory 2204 device. Lower level caches may then be implemented in various units within the GPC 2300 modules. For example, each of the SM 2500 modules may implement an L1 cache. The L1 cache is private memory that is dedicated to a particular SM 2500. Data from the L2 cache 2404 may be fetched and stored in each of the L1 caches for processing in the functional units of the SM 2500 modules. The L2 cache 2404 is coupled to the memory interface 2406 and the crossbar 2218.

The ROP 2402 performs graphics raster operations related to pixel color, such as color compression, pixel blending, and the like. The ROP 2402 also implements depth testing in conjunction with the raster engine 2308, receiving a depth for a sample location associated with a pixel fragment from the culling engine of the raster engine 2308. The depth is tested against a corresponding depth in a depth buffer for a sample location associated with the fragment. If the fragment passes the depth test for the sample location, then the ROP 2402 updates the depth buffer and transmits a result of the depth test to the raster engine 2308. It will be appreciated that the number of partition memory partition unit 2400 modules may be different than the number of GPC 2300 modules and, therefore, each ROP 2402 may be coupled to each of the GPC 2300 modules. The ROP 2402 tracks packets received from the different GPC 2300 modules and determines which GPC 2300 that a result generated by the ROP 2402 is routed to through the crossbar 2218. Although the ROP 2402 is included within the memory partition unit 2400 in FIG. 24, in other embodiments, the ROP 2402 may be outside of the memory partition unit 2400. For example, the ROP 2402 may reside in the GPC 2300 or another unit.

Figure 25:
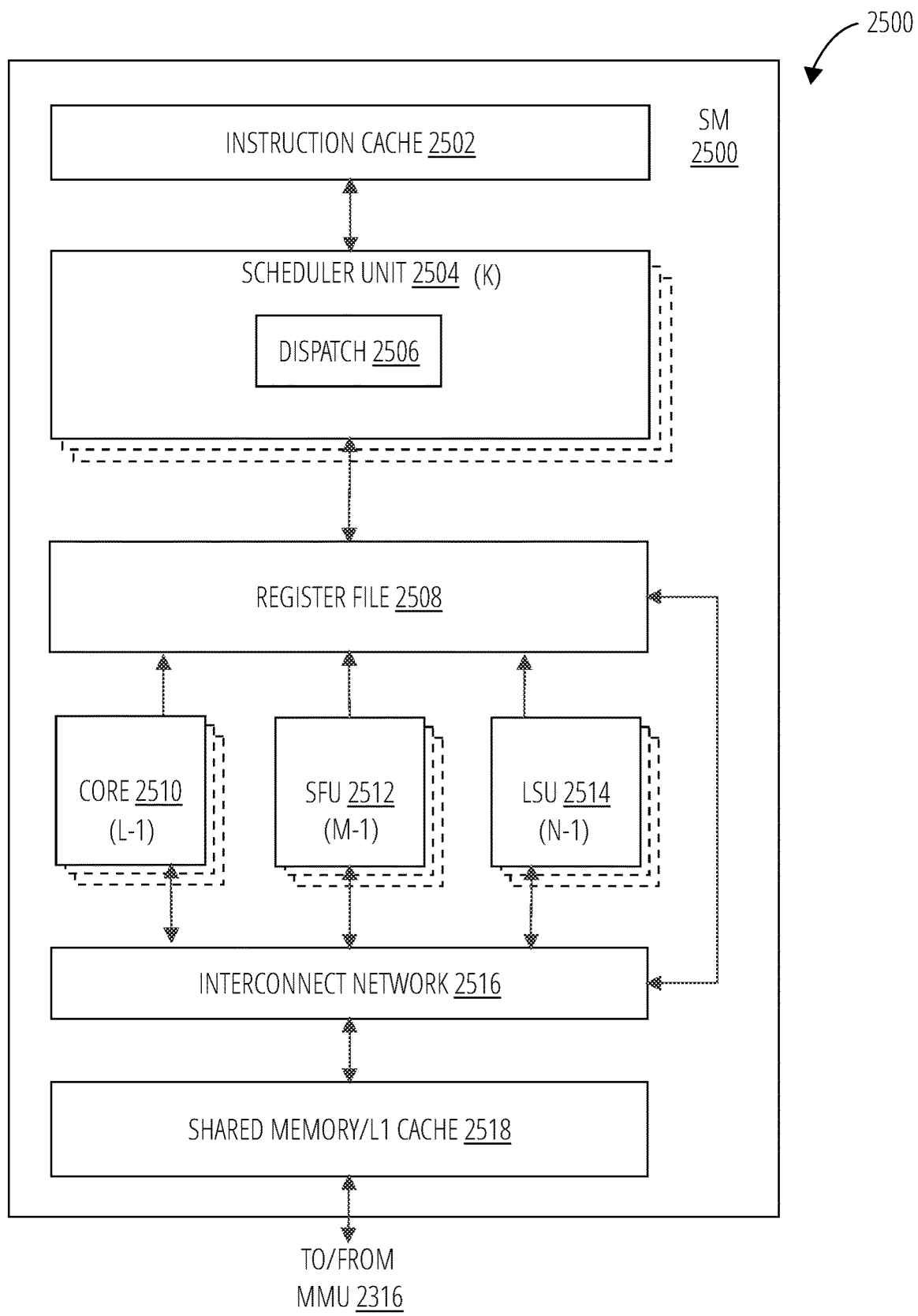
FIG. 25 illustrates an SM 2500 in accordance with one embodiment.

FIG. 25 illustrates the SM 2500 of FIG. 23, in accordance with an embodiment. As shown in FIG. 25, the SM 2500 includes an instruction cache 2502, one or more scheduler unit 2504 modules (e.g., such as scheduler unit 2212), a register file 2508, one or more processing core 2510 modules, one or more SFU 2512 modules, one or more LSU 2514 modules, an interconnect network 2516, and a shared memory/L1 cache 2518.

As described above, the work distribution unit 2214 dispatches tasks for execution on the GPC 2300 modules of the parallel processing unit 2200. The tasks are allocated to a particular DPC 2306 within a GPC 2300 and, if the task is associated with a shader program, the task may be allocated to an SM 2500. The scheduler unit 2212 receives the tasks from the work distribution unit 2214 and manages instruction scheduling for one or more thread blocks assigned to the SM 2500. The scheduler unit 2504 schedules thread blocks for execution as warps of parallel threads, where each thread block is allocated at least one warp. In an embodiment, each warp executes 32 threads. The scheduler unit 2504 may manage a plurality of different thread blocks, allocating the warps to the different thread blocks and then dispatching instructions from the plurality of different cooperative groups to the various functional units (e.g., core 2510 modules, SFU 2512 modules, and LSU 2514 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 2506 unit is configured within the scheduler unit 2504 to transmit instructions to one or more of the functional units. In one embodiment, the scheduler unit 2504 includes two dispatch 2506 units that enable two different instructions from the same warp to be dispatched during each clock cycle. In alternative embodiments, each scheduler unit 2504 may include a single dispatch 2506 unit or additional dispatch 2506 units.

Each SM 2500 includes a register file 2508 that provides a set of registers for the functional units of the SM 2500. In an embodiment, the register file 2508 is divided between each of the functional units such that each functional unit is allocated a dedicated portion of the register file 2508. In another embodiment, the register file 2508 is divided between the different warps being executed by the SM 2500. The register file 2508 provides temporary storage for operands connected to the data paths of the functional units.

Each SM 2500 comprises L processing core 2510 modules. In an embodiment, the SM 2500 includes a large number (e.g., 128, etc.) of distinct processing core 2510 modules. Each core 2510 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 2510 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 2510 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 2500 also comprises M SFU 2512 modules that perform special functions (e.g., attribute evaluation, reciprocal square root, and the like). In an embodiment, the SFU 2512 modules may include a tree traversal unit configured to traverse a hierarchical tree data structure. In an embodiment, the SFU 2512 modules may include texture unit configured to perform texture map filtering operations. In an embodiment, the texture units are configured to load texture maps (e.g., a 2D array of texels) from the memory 2204 and sample the texture maps to produce sampled texture values for use in shader programs executed by the SM 2500. In an embodiment, the texture maps are stored in the shared memory/L1 cache 2518. The texture units implement texture operations such as filtering operations using mip-maps (e.g., texture maps of varying levels of detail). In an embodiment, each SM 2500 includes two texture units.

Each SM 2500 also comprises N LSU 2514 modules that implement load and store operations between the shared memory/L1 cache 2518 and the register file 2508. Each SM 2500 includes an interconnect network 2516 that connects each of the functional units to the register file 2508 and the LSU 2514 to the register file 2508 and shared memory/L1 cache 2518. In an embodiment, the interconnect network 2516 is a crossbar that can be configured to connect any of the functional units to any of the registers in the register file 2508 and connect the LSU 2514 modules to the register file 2508 and memory locations in shared memory/L1 cache 2518.

The shared memory/L1 cache 2518 is an array of on-chip memory that allows for data storage and communication between the SM 2500 and the primitive engine 2312 and between threads in the SM 2500. In an embodiment, the shared memory/L1 cache 2518 comprises 128 KB of storage capacity and is in the path from the SM 2500 to the memory partition unit 2400. The shared memory/L1 cache 2518 can be used to cache reads and writes. One or more of the shared memory/L1 cache 2518, L2 cache 2404, and memory 2204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 2518 enables the shared memory/L1 cache 2518 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 22, are bypassed, creating a much simpler programming model. In the general purpose parallel computation configuration, the work distribution unit 2214 assigns and distributes blocks of threads directly to the DPC 2306 modules. The threads in a block execute the same program, using a unique thread ID in the calculation to ensure each thread generates unique results, using the SM 2500 to execute the program and perform calculations, shared memory/L1 cache 2518 to communicate between threads, and the LSU 2514 to read and write global memory through the shared memory/L1 cache 2518 and the memory partition unit 2400. When configured for general purpose parallel computation, the SM 2500 can also write commands that the scheduler unit 2212 can use to launch new work on the DPC 2306 modules.

The parallel processing unit 2200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 2200 is embodied on a single semiconductor substrate. In another embodiment, the parallel processing unit 2200 is included in a system-on-a-chip (SoC) along with one or more other devices such as additional parallel processing unit 2200 modules, the memory 2204, a reduced instruction set computer (RISC) CPU, a memory management unit (MMU), a digital-to-analog converter (DAC), and the like.

In an embodiment, the parallel processing unit 2200 may be included on a graphics card that includes one or more memory devices. The graphics card may be configured to interface with a PCIe slot on a motherboard of a desktop computer. In yet another embodiment, the parallel processing unit 2200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 26:
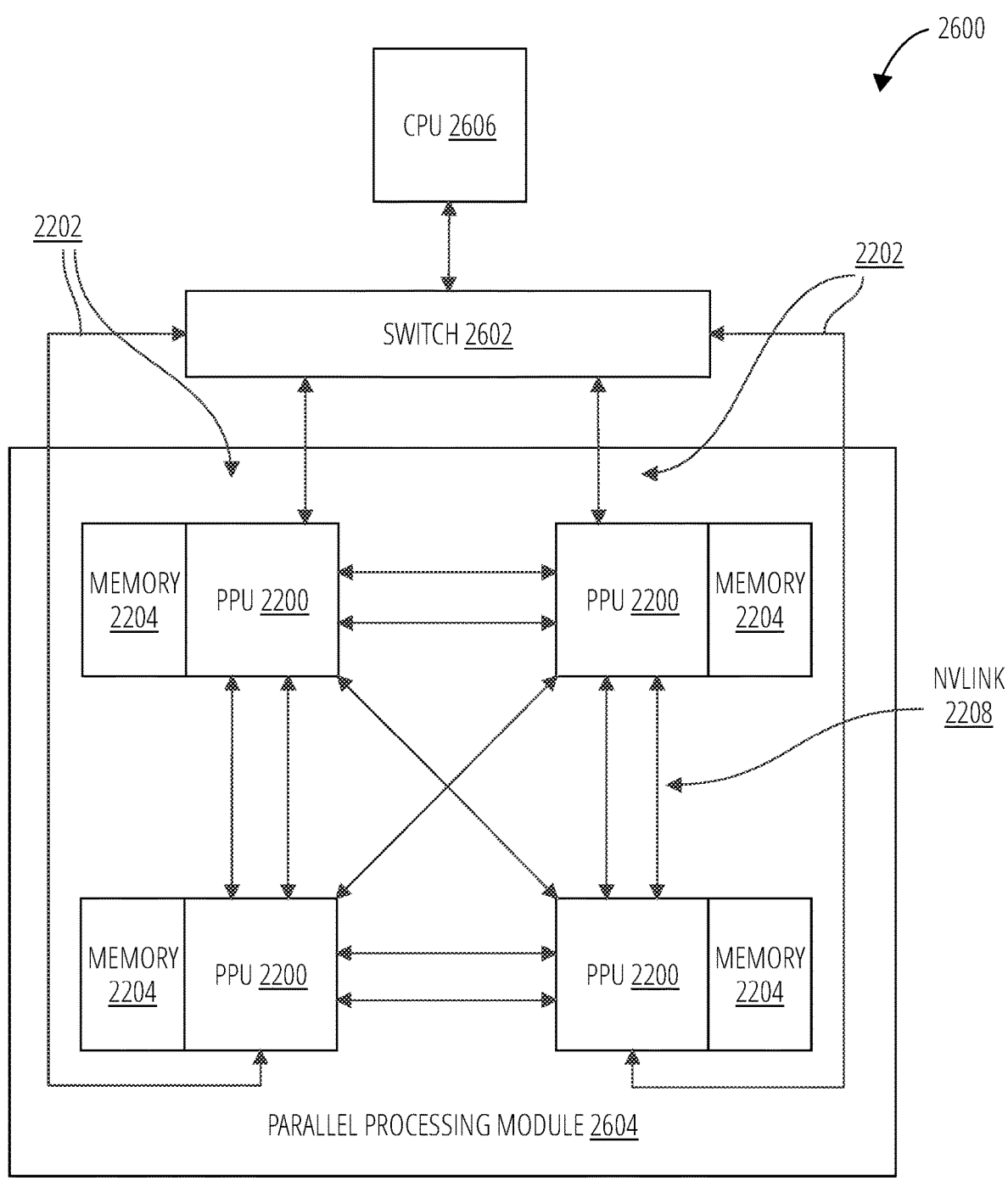
FIG. 26 illustrates a processing system 2600 in accordance with one embodiment.

FIG. 26 is a conceptual diagram of a processing system 2600 implemented using the parallel processing unit 2200 of FIG. 22, in accordance with an embodiment. The processing system 2600 includes a CPU 2606, switch 2602, and multiple parallel processing unit 2200 modules each and respective memory 2204 modules. The NVLink 2208 provides high-speed communication links between each of the parallel processing unit 2200 modules. Although a particular number of NVLink 2208 and interconnect 2202 connections are illustrated in FIG. 26, the number of connections to each parallel processing unit 2200 and the CPU 2606 may vary. The switch 2602 interfaces between the interconnect 2202 and the CPU 2606. The parallel processing unit 2200 modules, memory 2204 modules, and NVLink 2208 connections may be situated on a single semiconductor platform to form a parallel processing module 2604. In an embodiment, the switch 2602 supports two or more protocols to interface between various different connections and/or links.

In another embodiment (not shown), the NVLink 2208 provides one or more high-speed communication links between each of the parallel processing unit 2200 modules and the CPU 2606 and the switch 2602 interfaces between the interconnect 2202 and each of the parallel processing unit 2200 modules. The parallel processing unit 2200 modules, memory 2204 modules, and interconnect 2202 may be situated on a single semiconductor platform to form a parallel processing module 2604. In yet another embodiment (not shown), the interconnect 2202 provides one or more communication links between each of the parallel processing unit 2200 modules and the CPU 2606 and the switch 2602 interfaces between each of the parallel processing unit 2200 modules using the NVLink 2208 to provide one or more high-speed communication links between the parallel processing unit 2200 modules. In another embodiment (not shown), the NVLink 2208 provides one or more high-speed communication links between the parallel processing unit 2200 modules and the CPU 2606 through the switch 2602. In yet another embodiment (not shown), the interconnect 2202 provides one or more communication links between each of the parallel processing unit 2200 modules directly. One or more of the NVLink 2208 high-speed communication links may be implemented as a physical NVLink interconnect or either an on-chip or on-die interconnect using the same protocol as the NVLink 2208.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 2604 may be implemented as a circuit board substrate and each of the parallel processing unit 2200 modules and/or memory 2204 modules may be packaged devices. In an embodiment, the CPU 2606, switch 2602, and the parallel processing module 2604 are situated on a single semiconductor platform.

In an embodiment, the signaling rate of each NVLink 2208 is 20 to 25 Gigabits/second and each parallel processing unit 2200 includes six NVLink 2208 interfaces (as shown in FIG. 26, five NVLink 2208 interfaces are included for each parallel processing unit 2200). Each NVLink 2208 provides a data transfer rate of 25 Gigabytes/second in each direction, with six links providing 300 Gigabytes/second. The NVLink 2208 can be used exclusively for PPU-to-PPU communication as shown in FIG. 26, or some combination of PPU-to-PPU and PPU-to-CPU, when the CPU 2606 also includes one or more NVLink 2208 interfaces.

In an embodiment, the NVLink 2208 allows direct load/store/atomic access from the CPU 2606 to each parallel processing unit 2200 module's memory 2204. In an embodiment, the NVLink 2208 supports coherency operations, allowing data read from the memory 2204 modules to be stored in the cache hierarchy of the CPU 2606, reducing cache access latency for the CPU 2606. In an embodiment, the NVLink 2208 includes support for Address Translation Services (ATS), allowing the parallel processing unit 2200 to directly access page tables within the CPU 2606. One or more of the NVLink 2208 may also be configured to operate in a low-power mode.

Figure 27:
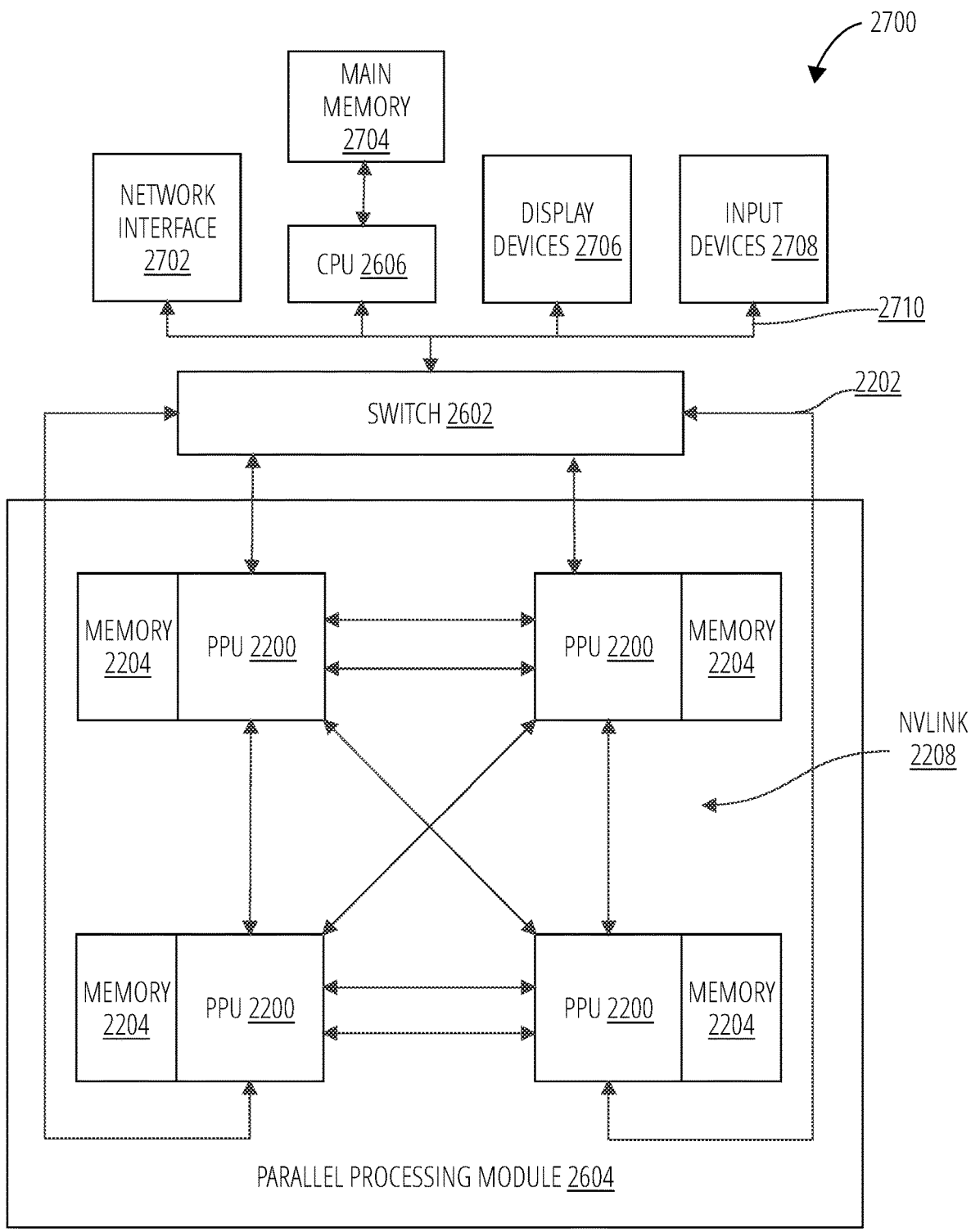
FIG. 27 illustrates an exemplary processing system 2700 in accordance with one embodiment.

FIG. 27 illustrates an exemplary processing system 2700 in which the various architecture and/or functionality of the various previous embodiments may be implemented. As shown, an exemplary processing system 2700 is provided including at least one CPU 2606 that is connected to a communication communications bus 2710. The communication communications bus 2710 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 2700 also includes a main memory 2704. Control logic (software) and data are stored in the main memory 2704 which may take the form of random access memory (RAM).

The exemplary processing system 2700 also includes input devices 2708, the parallel processing module 2604, and display devices 2706, e.g. a conventional CRT (cathode ray tube), LCD (liquid crystal display), LED (light emitting diode), plasma display or the like. User input may be received from the input devices 2708, e.g., keyboard, mouse, touchpad, microphone, and the like. Each of the foregoing modules and/or devices may even be situated on a single semiconductor platform to form the exemplary processing system 2700. Alternately, the various modules may also be situated separately or in various combinations of semiconductor platforms per the desires of the user.

Further, the exemplary processing system 2700 may be coupled to a network (e.g., a telecommunications network, local area network (LAN), wireless network, wide area network (WAN) such as the Internet, peer-to-peer network, cable network, or the like) through a network interface 2702 for communication purposes.

The exemplary processing system 2700 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 2704 and/or the secondary storage. Such computer programs, when executed, enable the exemplary processing system 2700 to perform various functions. The main memory 2704, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 2700 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 27 is a conceptual diagram of a graphics processing pipeline 2800 implemented by the parallel processing unit 2200 of FIG. 22, in accordance with an embodiment. In an embodiment, the parallel processing unit 2200 comprises a graphics processing unit (GPU). The parallel processing unit 2200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 2200 can be configured to process the graphics primitives to generate a frame buffer (e.g., pixel data for each of the pixels of the display).

An application writes model data for a scene (e.g., a collection of vertices and attributes) to a memory such as a system memory or memory 2204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SM 2500 modules of the parallel processing unit 2200 including one or more of a vertex shader, hull shader, domain shader, geometry shader, and a pixel shader. For example, one or more of the SM 2500 modules may be configured to execute a vertex shader program that processes a number of vertices defined by the model data. In an embodiment, the different SM 2500 modules may be configured to execute different shader programs concurrently. For example, a first subset of SM 2500 modules may be configured to execute a vertex shader program while a second subset of SM 2500 modules may be configured to execute a pixel shader program. The first subset of SM 2500 modules processes vertex data to produce processed vertex data and writes the processed vertex data to the L2 cache 2404 and/or the memory 2204. After the processed vertex data is rasterized (e.g., transformed from three-dimensional data into two-dimensional data in screen space) to produce fragment data, the second subset of SM 2500 modules executes a pixel shader to produce processed fragment data, which is then blended with other processed fragment data and written to the frame buffer in memory 2204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 2800 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 2800 receives input data 601 that is transmitted from one stage to the next stage of the graphics processing pipeline 2800 to generate output data 2804. In an embodiment, the graphics processing pipeline

2800 may represent a graphics processing pipeline defined by the OpenGL® API. As an option, the graphics processing pipeline 2800 may be implemented in the context of the functionality and architecture of the previous Figures and/or any subsequent Figure(s).

Figure 28:
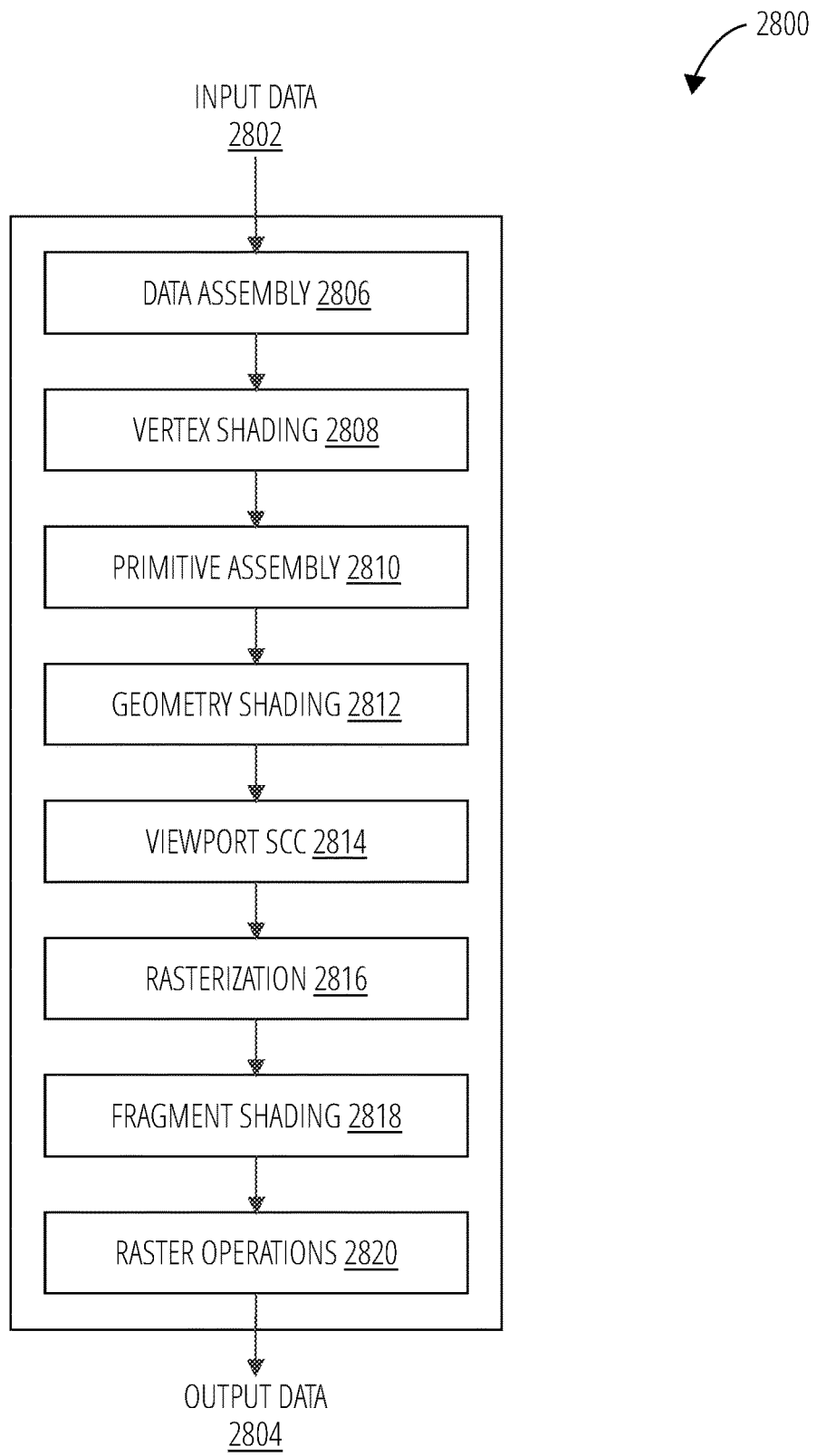
FIG. 28 illustrates a graphics processing pipeline 2800 in accordance with one embodiment.

As shown in FIG. 28, the graphics processing pipeline 2800 comprises a pipeline architecture that includes a number of stages. The stages include, but are not limited to, a data assembly 2806 stage, a vertex shading 2808 stage, a primitive assembly 2810 stage, a geometry shading 2812 stage, a viewport SCC 2814 stage, a rasterization 2816 stage, a fragment shading 2818 stage, and a raster operations 2820 stage. In an embodiment, the input data 2802 comprises commands that configure the processing units to implement the stages of the graphics processing pipeline 2800 and geometric primitives (e.g., points, lines, triangles, quads, triangle strips or fans, etc.) to be processed by the stages. The output data 2804 may comprise pixel data (e.g., color data) that is copied into a frame buffer or other type of surface data structure in a memory.

The data assembly 2806 stage receives the input data 2802 that specifies vertex data for high-order surfaces, primitives, or the like. The data assembly 2806 stage collects the vertex data in a temporary storage or queue, such as by receiving a command from the host processor that includes a pointer to a buffer in memory and reading the vertex data from the buffer. The vertex data is then transmitted to the vertex shading 2808 stage for processing.

The vertex shading 2808 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 2808 stage may manipulate individual vertex attributes such as position, color, texture coordinates, and the like. In other words, the vertex shading 2808 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 2808 stage generates transformed vertex data that is transmitted to the primitive assembly 2810 stage.

The primitive assembly 2810 stage collects vertices output by the vertex shading 2808 stage and groups the vertices into geometric primitives for processing by the geometry shading 2812 stage. For example, the primitive assembly 2810 stage may be configured to group every three consecutive vertices as a geometric primitive (e.g., a triangle) for transmission to the geometry shading 2812 stage. In some embodiments, specific vertices may be reused for consecutive geometric primitives (e.g., two consecutive triangles in a triangle strip may share two vertices). The primitive assembly 2810 stage transmits geometric primitives (e.g., a collection of associated vertices) to the geometry shading 2812 stage.

The geometry shading 2812 stage processes geometric primitives by performing a set of operations (e.g., a geometry shader or program) on the geometric primitives. Tessellation operations may generate one or more geometric primitives from each geometric primitive. In other words, the geometry shading 2812 stage may subdivide each geometric primitive into a finer mesh of two or more geometric primitives for processing by the rest of the graphics processing pipeline 2800. The geometry shading 2812 stage transmits geometric primitives to the viewport SCC 2814 stage.

In an embodiment, the graphics processing pipeline 2800 may operate within a streaming multiprocessor and the vertex shading 2808 stage, the primitive assembly 2810 stage, the geometry shading 2812 stage, the fragment shading 2818 stage, and/or hardware/software associated therewith, may sequentially perform processing operations. Once the sequential processing operations are complete, in an embodiment, the viewport SCC 2814 stage may utilize the data. In an embodiment, primitive data processed by one or more of the stages in the graphics processing pipeline 2800 may be written to a cache (e.g. L1 cache, a vertex cache, etc.). In this case, in an embodiment, the viewport SCC 2814 stage may access the data in the cache. In an embodiment, the viewport SCC 2814 stage and the rasterization 2816 stage are implemented as fixed function circuitry.

The viewport SCC 2814 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 2816 stage.

The rasterization 2816 stage converts the 3D geometric primitives into 2D fragments (e.g. capable of being utilized for display, etc.). The rasterization 2816 stage may be configured to utilize the vertices of the geometric primitives to setup a set of plane equations from which various attributes can be interpolated. The rasterization 2816 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 2816 stage generates fragment data (e.g., interpolated vertex attributes associated with a particular sample location for each covered pixel) that are transmitted to the fragment shading 2818 stage.

The fragment shading 2818 stage processes fragment data by performing a set of operations (e.g., a fragment shader or a program) on each of the fragments. The fragment shading 2818 stage may generate pixel data (e.g., color values) for the fragment such as by performing lighting operations or sampling texture maps using interpolated texture coordinates for the fragment. The fragment shading 2818 stage generates pixel data that is transmitted to the raster operations 2820 stage.

The raster operations 2820 stage may perform various operations on the pixel data such as performing alpha tests, stencil tests, and blending the pixel data with other pixel data corresponding to other fragments associated with the pixel. When the raster operations 2820 stage has finished processing the pixel data (e.g., the output data 2804), the pixel data may be written to a render target such as a frame buffer, a color buffer, or the like.

It will be appreciated that one or more additional stages may be included in the graphics processing pipeline 2800 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 2812 stage). Other types of graphics processing pipelines are contemplated as being within the scope of the present disclosure. Furthermore, any of the stages of the graphics processing pipeline 2800 may be implemented by one or more dedicated hardware units within a graphics processor such as parallel processing unit 2200. Other stages of the graphics processing pipeline 2800 may be implemented by programmable hardware units such as the SM 2500 of the parallel processing unit 2200.

The graphics processing pipeline 2800 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 2200. The API provides an abstraction for a programmer that lets a programmer utilize specialized graphics hardware, such as the parallel processing unit 2200, to generate the graphical data without requiring the programmer to utilize the specific instruction set for the parallel processing unit 2200. The application may include an API call that is routed to the device driver for the parallel processing unit 2200. The device driver interprets the API call and performs various operations to respond to the API call. In some instances, the device driver may perform operations by executing instructions on the CPU. In other instances, the device driver may perform operations, at least in part, by launching operations on the parallel processing unit 2200 utilizing an input/output interface between the CPU and the parallel processing unit 2200. In an embodiment, the device driver is configured to implement the graphics processing pipeline 2800 utilizing the hardware of the parallel processing unit 2200.

Various programs may be executed within the parallel processing unit 2200 in order to implement the various stages of the graphics processing pipeline 2800. For example, the device driver may launch a kernel on the parallel processing unit 2200 to perform the vertex shading 2808 stage on one SM 2500 (or multiple SM 2500 modules). The device driver (or the initial kernel executed by the parallel processing unit 2200) may also launch other kernels on the parallel processing unit 2200 to perform other stages of the graphics processing pipeline 2800, such as the geometry shading 2812 stage and the fragment shading 2818 stage. In addition, some of the stages of the graphics processing pipeline 2800 may be implemented on fixed unit hardware such as a rasterizer or a data assembler implemented within the parallel processing unit 2200. It will be appreciated that results from one kernel may be processed by one or more intervening fixed function hardware units before being processed by a subsequent kernel on an SM 2500.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. Logic refers to machine memory circuits, non-transitory machine-readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device.

Magnetic media, electronic circuits, electrical and optical memory (both volatile and nonvolatile), programmable devices, and firmware are examples of logic. Logic specifically excludes pure signals or software per se (however does not exclude machine memories comprising software and thereby forming configurations of matter). Logic may be implemented by hardware, machine readable media comprising software, firmware, or combinations thereof.

The code sections disclosed herein may be implemented in various ways as software comprising instructions executed on one or more programmable device. By way of example, the disclosed code sections may be implemented as an application, an app, drivers, operating system, or services, including one or more processes, modules, subroutines, plug-in, or tasks. "Task" refers to one or more operations that a process performs. "Plug-in" refers to software that adds features to an existing computer program without rebuilding (e.g., changing or re-compiling) the computer program. Plug-ins are commonly used for example with Internet browser applications. "Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'. "Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client. "App" refers to a type of application with limited functionality, most commonly associated with applications executed on mobile devices. Apps tend to have a more limited feature set and simpler user interface than applications as those terms are commonly understood in the art. The code sections may form part of software modules, library, or executable. "Executable" refers to a file comprising executable code. If the executable code is not interpreted computer code, a loader is typically used to load the executable for execution by a programmable device. "Loader" refers to logic for loading programs and libraries. The loader is typically implemented by the operating system. A typical loader copies an executable into memory and prepares it for execution by performing certain transformations, such as on memory addresses. "File" refers to a unitary package for storing, retrieving, and communicating data and/or instructions. A file is distinguished from other types of packaging by having associated management metadata utilized by the operating system to identify, characterize, and access the file. "Library" refers to a collection of modules organized such that the functionality of all the modules may be included for use by software using references to the library in source code. "Computer program" refers to another term for 'application' or 'app'.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. "Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported. Computer programs often implement mathematical functions or algorithms and may implement or utilize one or more application program interfaces. "Algorithm" refers to any set of instructions configured to cause a machine to carry out a particular function or process.

A compiler is typically used to transform source code into object code and thereafter a linker combines object code files into an executable application, recognized by those skilled in the art as an "executable". "Linker" refers to logic that inputs one or more object code files generated by a compiler or an assembler and combines them into a single executable, library, or other unified object code output. One implementation of a linker directs its output directly to machine memory as executable code (performing the function of a loader as well). The distinct file comprising the executable would then be available for use by a programmable device that may employ a loader to place the executable and any associated library in memory for execution. The operating system executes the program by passing control to the loaded program code, creating a task, one or more thread, or process. An alternate means of executing an application or app involves the use of an interpreter.

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation. The foregoing detailed description of embodiments of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to mean_machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed.

What is claimed is:

1. A computer system comprising:
one or more processors; and
a memory comprising instructions that when executed by the one or more processors implement a code profiler configured to insert instructions into a code segment to configure a machine executing the code segment to:
predict arrival of a thread executing the code segment at an execution barrier in the code segment;
confirm that execution of the thread reached the execution barrier;
cancel the predicted arrival of the thread at the execution barrier in a branch of the code segment that will not encounter the execution barrier.

2. The system of claim 1, wherein the code profiler is configured to insert at least one instruction predicting an eventual arrival of the thread at the execution barrier, the at least one instruction comprising an instruction to join the execution barrier.

3. The system of claim 1, the code profiler further configured to insert one or more instructions into the code segment to cause the thread to rejoin the execution barrier after execution of the thread resumes at an execution point subsequent to the execution barrier.

4. The system of claim 1, the inserted instructions further configuring the machine to: resume execution of threads suspended at the execution barrier on condition that no more threads are predicted to arrive at the execution barrier.

5. The system of claim 1, wherein the execution barrier is indicated by a code marker.

6. The system of claim 1, the code profile further configured to set a range in the code segment for which the prediction of arrival of the thread applies.

7. The system of claim 1, the code profiler further configured to insert one or more instructions into the code segment to:
configure a threshold value; and
configure the machine executing the instructions to resume execution of threads suspended at the execution barrier on condition that a number of the threads that have not yet arrived at the execution barrier satisfies the threshold value.

8. The system of claim 1, the code profiler comprising:
logic to detect a conflict in a live range of two or more execution barriers, wherein one of the two or more execution barriers is located at a post-dominator of two or more divergent branches of the code segment; and
logic to eliminate the one of the two or more execution barriers located at the post-dominator in response to detecting the conflict.

9. The system of claim 1, the code profiler comprising:
logic to detect a conflict in a live range of two or more execution barriers, wherein one of the execution barriers is located at a post-dominator of two or more divergent branches of the code segment; and
logic to insert one or more instructions into the code segment to cause the thread to cancel, upon reaching one of the two or more conflicting execution barriers, predicted arrival at other ones of the two or more conflicting execution barriers.

10. A method comprising:
executing one or more instructions in a code segment to predict arrival of multiple threads executing the code segment at a first execution barrier in the code segment;
suspending the execution of one or more of the threads that reach the first execution barrier while one or more of the threads that have not reached the first execution barrier are predicted to arrive at the first execution barrier; and
executing a set of the one or more instructions, in a branch of the code segment that will not encounter the first execution barrier, canceling the predicted arrival at the first execution barrier of one or more of the threads that have not reached the first execution barrier.

11. The method of claim 10, further comprising resuming the execution of the one or more threads suspended at the first execution barrier on condition that all of the threads predicted to arrive at the first execution barrier have arrived.

12. The method of claim 10, further comprising resuming the execution of the one or more threads suspended at the first execution barrier on condition that a number of the one or more threads that remain predicted to arrive at the first execution barrier is less than a threshold level greater than zero.

13. The method of claim 10, further comprising:
marking one or more ranges in the code segment for which predictions of arrival of the threads at the first execution barrier are operable.

14. The method of claim 10, further comprising: canceling arrival at the first execution barrier of threads that arrive at a second execution barrier that conflicts with the first execution barrier.

15. An apparatus comprising: one or more processors; a memory comprising instructions that when executed by the one or more processors result in the apparatus:
executing one or more of the instructions in a code segment predicting arrival of a thread executing the code segment at an execution barrier in the code segment;
suspending the execution of the thread at the execution barrier in a first execution branch of the code segment while one or more other threads are predicted to arrive at the execution barrier; and
executing one or more of the instructions canceling, in branches of the code segment divergent from the first execution branch comprising the execution barrier, predictions that at least one of the other threads will arrive at the execution barrier.

16. The apparatus of claim 15, the execution barrier located in a variable iteration count loop of the code segment.

17. The apparatus of claim 15, the memory further comprising instructions that when executed by the one or more processors result in the apparatus:
causing at least one of the multiple threads to rejoin the execution barrier at an execution point subsequent to the execution barrier.

18. The apparatus of claim 15, further comprising logic configured to carry out deconfliction of convergence barriers for non-identical overlapping ranges of the code segment.

19. A method comprising:
executing one or more instructions in a code segment:
predicting that a plurality of threads will arrive at an execution convergence point;
canceling a predicted arrival of a first one or more of the threads at the execution convergence point in an execution branch that will not execute to the execution convergence point; and
delaying execution of at least one of the threads that reached the execution convergence point at the execution convergence point until a configured number of the threads that have not canceled the predicted arrival at the execution convergence point, arrive at the execution convergence point.

* * * * *